(12) United States Patent
Kubat et al.

(10) Patent No.: US 12,398,761 B2
(45) Date of Patent: Aug. 26, 2025

(54) MULTIPLE STAGE TORSIONAL COUPLING WITH CENTERING BEARING AND COIL SPRING SNUBBING

(71) Applicant: LORD Corporation, Cary, NC (US)

(72) Inventors: Timothy J. Kubat, Fairview, PA (US); Nicholas C. McEldowney, Erie, PA (US)

(73) Assignee: LORD Corporation, Cary, NC (US)

( * ) Notice: Subject to any disclaimer, the term of this patent is extended or adjusted under 35 U.S.C. 154(b) by 421 days.

(21) Appl. No.: 17/916,184

(22) PCT Filed: Apr. 9, 2021

(86) PCT No.: PCT/US2021/026538
§ 371 (c)(1),
(2) Date: Sep. 30, 2022

(87) PCT Pub. No.: WO2021/207578
PCT Pub. Date: Oct. 14, 2021

(65) Prior Publication Data
US 2023/0175555 A1 Jun. 8, 2023

Related U.S. Application Data

(60) Provisional application No. 63/008,025, filed on Apr. 10, 2020.

(51) Int. Cl.
*F16F 15/123* (2006.01)
*F16D 3/12* (2006.01)

(52) U.S. Cl.
CPC .......... *F16D 3/12* (2013.01); *F16F 15/12373* (2013.01); *F16D 2300/22* (2013.01); *F16F 15/12326* (2013.01)

(58) Field of Classification Search
CPC .. F16D 3/12; F16D 2300/22; F16F 15/12373; F16F 15/12326
(Continued)

(56) References Cited

U.S. PATENT DOCUMENTS 2,065,601 A * 12/1936 Meyer ................... F16F 15/127
192/211
2,513,379 A 7/1950 Thelander
(Continued)

FOREIGN PATENT DOCUMENTS

JP        S58 631 A      1/1983
JP     2000 205296 A    7/2000

OTHER PUBLICATIONS

International Search Report and Written Opinion for Application No. PCT/US2021/026538 dated Jul. 15, 201.

*Primary Examiner* — Greg Binda
(74) *Attorney, Agent, or Firm* — KDW FIRM PLLC

(57) ABSTRACT

In a multi-stage torsional coupling and associated methods of providing variable stiffness, the coupling has an inner member connected to a first torsional connection, a sprocket plate connected to the inner member, one or more plates connected to a second torsional connection, an outer member rigidly attached to the one or more plates, and a plurality of damping stages arranged for sequential engagement by movement of the sprocket plate relative to the one or more plates to provide a variable stiffness over a angle of angular displacement for the multi-stage torsional coupling. The sprocket plate is rotatable relative to the one or more plates to sequentially engage the plurality of damping stages to provide stiffness between the first and second torsional connections that increases in a non-linear, or stepped, manner as the amplitude of the angular displacement of the sprocket plate relative to the one or more plates increases.

28 Claims, 13 Drawing Sheets

(58) Field of Classification Search
USPC .............. 464/68.91, 68.92, 89; 192/211, 213
See application file for complete search history.

(56) References Cited

U.S. PATENT DOCUMENTS

| | | |
|---|---|---|
| 4,239,097 A | 12/1980 | Graeacen et al. |
| 4,693,354 A * | 9/1987 | Umeyama ............. F16F 15/124 |
| | | 464/90 |
| 4,735,297 A | 4/1988 | Koshimo |
| 6,565,445 B1 * | 5/2003 | Miller ..................... F16F 1/128 |
| 2016/0258521 A1 | 9/2016 | Kawahara et al. |

\* cited by examiner

MULTIPLE STAGE TORSIONAL COUPLING WITH CENTERING BEARING AND COIL SPRING SNUBBING

CROSS-REFERENCE TO RELATED APPLICATION

This is a National Stage Application filed under 35 U.S.C. 371 based on International Patent Application No. PCT/US2021/026538, filed on Apr. 9, 2021, which claims priority to U.S. Provisional Patent Application Ser. No. 63/008,025, which was filed on Apr. 10, 2020, the disclosure of which is incorporated by reference herein in its entirety.

TECHNICAL FIELD

The subject matter herein generally relates to torsional couplings. The subject matter herein more particularly relates to multi-stage torsional couplings and methods capable of providing different stiffness values at different torque levels.

BACKGROUND

Multi-stage torsional couplings provide different stiffness value at different torque levels as shown in the load deflection curve below. The stiffness selected is related to the downstream rotating inertia. A low torsional stiffness is needed to isolate the engine vibratory torque from the downstream rotating bodies if the rotating inertia in the drivetrain is low, such as when the transmission is in Neutral gear. Given a fixed rotating inertia, an engine can run at a lower idle speed with lower torsional stiffness values. This can allow a fuel savings as some off-highway and agricultural machinery spend a large percentage of time at idle. Once the transmission is in gear, both the rotating inertia and engine speed increase. Isolation can be obtained with a higher torsional stiffness.

One disadvantage associated with known multi-stage torsional couplings is sealing the area that houses the coil springs and grease from dirt and debris to prevent their entry from the transmission side of the coupling. The flywheel side of the torsional coupling is sealed due to the coupling mounting and sealing against the flywheel. Known torsional couplings use seals to accomplish this sealing from the transmission side of the coupling.

Another disadvantage associated with known multi-stage torsional couplings relate to accommodating an axial thrust force, a radial force, and a cocking torque, all while ensuring that the inner member is maintained in a centered position, with respect to the outer member.

Accordingly, a need exists for a multi-stage torsional coupling capable of addressing one or more of the disadvantages inherent in known multi-stage torsional couplings.

SUMMARY

In one aspect, a multi-stage torsional coupling is provided, the multi-stage torsional coupling comprising: an inner member connected to a first torsional connection; a sprocket plate connected to the inner member; one or more plates connected to a second torsional connection; an outer member rigidly attached to the one or more plates; and a plurality of damping stages that are arranged for sequential engagement by movement of the sprocket plate relative to the one or more plates to provide a variable stiffness over a range of angular displacement for the multi-stage torsional coupling. The sprocket plate is configured to rotate relative to the one or more plates to sequentially engage the plurality of damping stages to provide stiffness between the first and second torsional connections that increases in a non-linear, or stepped, manner as the amplitude of the angular displacement of the sprocket plate relative to the one or more plates increases.

In some embodiments of the multi-stage torsional coupling described hereinabove, the stiffness provided by the plurality of damping stages increases disproportionately to a rate of increase of the amplitude of the angular displacement of the sprocket plate relative to the one or more plates.

In some embodiments of the multi-stage torsional coupling described hereinabove, the plurality of damping stages comprises a first damping stage, which comprises an elastomeric material between the inner member and the outer member, wherein the elastomeric material is configured for torsional deformation as the inner member and the outer member rotate relative to each other and for damping vibrations and/or movement between the inner member and the outer member.

In some embodiments of the multi-stage torsional coupling described hereinabove, the plurality of damping stages comprises a second damping stage, which comprises one or more first coil spring assemblies, each of which comprises one or more coil springs and is arranged within one of a plurality of pockets formed in and circumferentially about the sprocket plate; the one or more plates have pockets formed therein, the pockets being spaced circumferentially about the sprocket plate and extending in a circumferential direction of the sprocket plate; the pockets of the sprocket plate and the pockets of the one or more plates are aligned with each other when the multi-stage torsional coupling is in an undeflected state to define a plurality of slots, each of the one or more first coil spring assemblies being arranged within a corresponding slot of the plurality of slots; and an angular displacement of the sprocket plate relative to the one or more plates causes each of the one or more first coil spring assemblies to move in the circumferential direction of the sprocket plate along a length of the slot in which each of the one or more first coil spring assemblies is positioned and/or, when the angular displacement of the sprocket plate relative to the one or more plates causes the slot to have a length that is shorter than an uncompressed length of the one or more first coil spring assemblies, to compress the one or more coil springs of the one or more first coil spring assemblies between opposing ends of the slot, as defined by contact of the one or more first coil spring assemblies with the sprocket plate and the one or more plates.

In some embodiments of the multi-stage torsional coupling described hereinabove, each of the one or more first coil spring assemblies are positioned between coil spring holders that are slidably positioned within each slot in which one of the one or more first coil spring assemblies is arranged, wherein the coil spring holders compress the one or more coil springs positioned therebetween after one of the coil spring holders, in a direction of rotation of the sprocket plate, makes contact with an end of the slot in which such coil spring holder is positioned to engage the second damping stage.

In some embodiments of the multi-stage torsional coupling described hereinabove, the plurality of damping stages comprises a final damping stage, which comprises snubbing pads that limit an axial compression of the one or more first coil spring assemblies.

In some embodiments of the multi-stage torsional coupling described hereinabove, the plurality of damping stages comprises a third damping stage, which comprises one or more second coil spring assemblies, each of which comprises one or more coil springs and is arranged within one of the plurality of pockets formed in and circumferentially about the sprocket plate; each of the one or more second coil spring assemblies is arranged within a corresponding slot of the plurality of slots defined by alignment of the pockets of the one or more plates and the pockets of the sprocket plates; and an angular displacement of the sprocket plate relative to the one or more plates causes each of the one or more second coil spring assemblies to move in the circumferential direction of the sprocket plate along a length of the slot in which each of the one or more second coil spring assemblies is positioned and/or, when the angular displacement of the sprocket plate relative to the one or more plates causes the slot to have a length that is shorter than an uncompressed length of the one or more second coil spring assemblies, to compress the one or more coil springs of the one or more second coil spring assemblies between opposing ends of the slot, as defined by contact of the one or more second coil spring assemblies with the sprocket plate and the one or more plates.

In some embodiments of the multi-stage torsional coupling described hereinabove, each of the one or more second coil spring assemblies are positioned between coil spring holders that are slidably positioned within each slot in which one of the one or more second coil spring assemblies is arranged, wherein the coil spring holders compress the one or more coil springs positioned therebetween after one of the coil spring holders, in the direction of rotation of the sprocket plate, makes contact with an end of the slot in which such coil spring holder is positioned to engage the third damping stage.

In some embodiments of the multi-stage torsional coupling described hereinabove, the one or more second coil spring assemblies of the third damping stage are shorter than the one or more first coil spring assemblies of the second damping stage, such that the one or more first coil spring assemblies of the second damping stage are compressed at a lower amplitude relative angular displacement between the one or more plates and the sprocket plate than the one or more second coil spring assemblies of the third damping stage, such that the second damping stage and the third damping stage are engaged sequentially as the sprocket plate is rotated relative to the one or more plates.

In some embodiments of the multi-stage torsional coupling described hereinabove, the plurality of damping stages comprises a final damping stage, which comprises snubbing pads that limit an axial compression of the one or more first coil spring assemblies and/or the one or more second coil spring assemblies.

In some embodiments of the multi-stage torsional coupling described hereinabove, the first torsional connection comprises an engine flywheel.

In some embodiments of the multi-stage torsional coupling described hereinabove, the second torsional connection comprises a transmission driveshaft.

In some embodiments, the multi-stage torsional coupling described hereinabove comprises a centering bearing configured to react axial thrust forces and radial forces and to prevent cocking of the sprocket plate relative to the outer member.

In some embodiments of the multi-stage torsional coupling described hereinabove, the centering bearing is a split bearing, having a first race in direct contact with a top plate of the one or more plates and a second race in direct contact with a bottom plate of the one or more plates, wherein the first race is on an opposite side of the sprocket plate from the second race.

In another aspect, a method of providing variable stiffness in a torsional coupling is provided, the method comprising providing a multi-stage torsional coupling comprising an inner member connected to a first torsional connection; a sprocket plate connected to the inner member; a one or more plates connected to a second torsional connection; an outer member rigidly attached to the one or more plates; and a plurality of damping stages that are arranged for sequential engagement by movement of the sprocket plate relative to the one or more plates to provide a variable stiffness over a range of angular displacement for the multi-stage torsional coupling; the method also comprising rotating the sprocket plate relative to the one or more plates to sequentially engage the plurality of damping stages to provide stiffness between the first and second torsional connections that increases in a non-linear, or stepped, manner as the angular displacement of the sprocket plate relative to the one or more plates increases.

In some embodiments of the method described hereinabove, the stiffness provided by the plurality of damping stages increases disproportionately to a rate of increase of the angular displacement of the sprocket plate relative to the one or more plates.

In some embodiments of the method described hereinabove, the plurality of damping stages comprises a first damping stage, which comprises an elastomeric material between the inner member and the outer member, the method comprising rotating the inner member relative to the outer member to torsionally deform the elastomeric material and damp vibrations and/or movement between the inner member and the outer member.

In some embodiments of the method described hereinabove, the plurality of damping stages comprises a second damping stage, which comprises one or more first coil spring assemblies, each of which comprises one or more coil springs and is arranged within one of a plurality of pockets formed in and circumferentially about the sprocket plate; the one or more plates have pockets formed therein, the pockets being spaced circumferentially about the sprocket plate and extending in a circumferential direction of the sprocket plate; the pockets of the sprocket plate and the pockets of the one or more plates are aligned with each other when the multi-stage torsional coupling is in an undeflected state to define a plurality of slots, each of the one or more first coil spring assemblies being arranged within a corresponding slot of the plurality of slots; and an angular displacement of the sprocket plate relative to the one or more plates causes each of the one or more first coil spring assemblies to move in the circumferential direction of the sprocket plate along a length of the slot in which each of the one or more first coil spring assemblies is positioned and/or, when the angular displacement of the sprocket plate relative to the one or more plates causes the slot to have a length that is shorter than an uncompressed length of the one or more first coil spring assemblies, to compress the one or more coil springs of the one or more first coil spring assemblies between opposing ends of the slot, as defined by contact of the one or more first coil spring assemblies with the sprocket plate and the one or more plates.

In some embodiments of the method described hereinabove, each of the one or more first coil spring assemblies are positioned between coil spring holders that are slidably positioned within each slot in which one of the one or more first coil spring assemblies is arranged, wherein the coil spring holders compress the one or more coil springs positioned therebetween after one of the coil spring holders, in a direction of rotation of the sprocket plate, makes contact with an end of the slot in which such coil spring holder is positioned to engage the second damping stage.

In some embodiments of the method described hereinabove, the plurality of damping stages comprises a final damping stage, which comprises snubbing pads that limit an axial compression of the one or more first coil spring assemblies.

In some embodiments of the method described hereinabove, the plurality of damping stages comprises a third damping stage, which comprises one or more second coil spring assemblies, each of which comprises one or more coil springs and is arranged within one of the plurality of pockets formed in and circumferentially about the sprocket plate; each of the one or more second coil spring assemblies is arranged within a corresponding slot of the plurality of slots defined by alignment of the pockets of the one or more plates and the pockets of the sprocket plates; and an angular displacement of the sprocket plate relative to the one or more plates causes each of the one or more second coil spring assemblies to move in the circumferential direction of the sprocket plate along a length of the slot in which each of the one or more second coil spring assemblies is positioned and/or, when the angular displacement of the sprocket plate relative to the one or more plates causes the slot to have a length that is shorter than an uncompressed length of the one or more second coil assemblies, to compress the one or more coil springs of the one or more second coil spring assemblies between opposing ends of the slot, as defined by contact of the one or more second coil spring assemblies with the sprocket plate and the one or more plates.

In some embodiments of the method described hereinabove, each of the one or more second coil spring assemblies are positioned between coil spring holders that are slidably positioned within each slot in which one of the one or more second coil spring assemblies is arranged, wherein the coil spring holders compress the one or more coil springs positioned therebetween after one of the coil spring holders, in the direction of rotation of the sprocket plate, makes contact with an end of the slot in which such spring holder is positioned to engage the third damping stage.

In some embodiments of the method described hereinabove, the one or more second coil spring assemblies of the third damping stage are shorter than the one or more first coil spring assemblies of the second damping stage, such that the one or more first coil spring assemblies of the second damping stage are compressed at a lower amplitude relative angular displacement between the one or more plates and the sprocket plate than the one or more second coil spring assemblies of the third damping stage, such that the second damping stage and the third damping stage are engaged sequentially as the sprocket plate is rotated relative to the one or more plates.

In some embodiments of the method described hereinabove, the plurality of damping stages comprises a final damping stage, which comprises snubbing pads that limit an axial compression of the one or more first coil spring assemblies and/or the one or more second coil spring assemblies.

In some embodiments of the method described hereinabove, the first torsional connection comprises an engine flywheel.

In some embodiments of the method described hereinabove, the second torsional connection comprises a transmission driveshaft.

In some embodiments, the method described hereinabove comprises reacting, using a centering bearing, axial thrust forces and radial forces and preventing cocking of the sprocket plate relative to the outer member.

In some embodiments of the method described hereinabove, the centering bearing is a split bearing, having a first race in direct contact with a top plate of the one or more plates and a second race in direct contact with a bottom plate of the one or more plates, wherein the first race is on an opposite side of the sprocket plate from the second race.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

In multi-stage torsional couplings, low torsional stiffness is needed to isolate the engine vibratory torque from the downstream rotating bodies for operating conditions during which the rotating inertia in the drivetrain is low, such as when the transmission is in Neutral gear. Given a fixed rotating inertia, an engine is able to run at a lower idle speed, with a lower torsional stiffness value. This can advantageously allow for significant fuel savings when a machine is idling, especially for off-highway and agricultural machinery that are known to spend a large percentage of their operating time at an idle (e.g., neutral) condition. Once the transmission is shifted to engage a selected gear (e.g., first gear), both the rotating inertia and engine speed can increase. Isolation characteristics between the engine and transmission can be obtained with a higher torsional stiffness for the torsional coupling.

Figure 1:
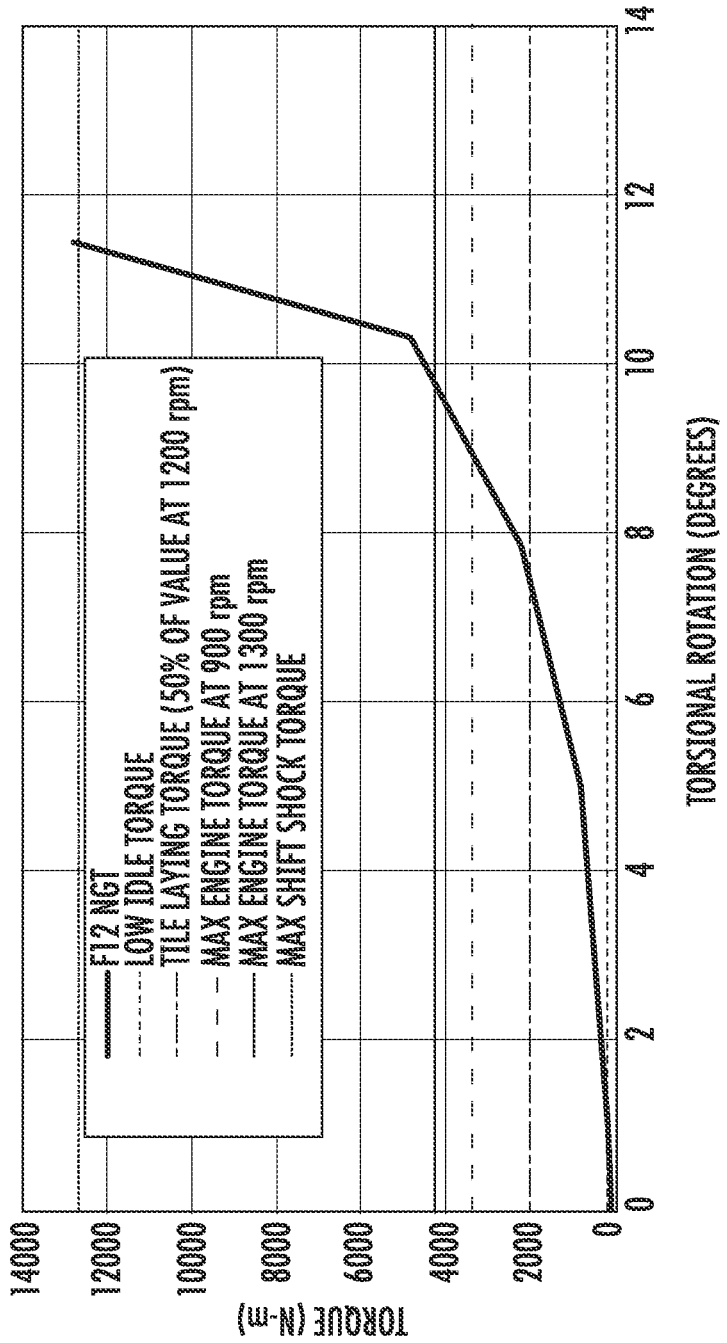
FIG. 1 is a graphical plot of a torsional characteristic curve for an example embodiment of a multi-stage torsional coupling.

FIG. 1 is a graphical plot showing a torsional characteristic curve for an example embodiment of a multi-stage torsional coupling. The thickest solid line shows a plot of the torque (y-axis) that is needed to cause a torsional rotation (x-axis) of the example embodiment multi-stage torsional coupling. Example torsional loads that are transmitted at various operational states of a machine are plotted as horizontal lines extending from the y-axis. It can be seen that the torsional stiffness provided by the multi-stage torsional coupling is variable and increases as a function of torsional rotation of the multi-stage torsional input. It can further be seen that the torsional stiffness the torsional stiffness provided by the multi-stage torsional coupling is non-linear with respect to the torsional rotation of the multi-stage torsional coupling. As such, the torsional characteristic curve has the general appearance of a plurality of line segments assembled end-to-end, each line segment having a different slope from each adjacent line segment, with the slope of each subsequent line segment being greater than the previous line segment, at least relative to the y-axis. Additionally, some of the line segments may be non-linear themselves, even though no subsequent damping stage is engaged. For the example graphical plot shown in FIG. 1, the multi-stage torsional coupling has four (4) damping stages that are sequentially engaged. Sequential engagement means that all previously engaged damping stages remain engaged when a further damping stage is engaged. Thus, upon engagement of the second damping stage, the first damping stage remains engaged. Similarly, upon engagement of the third damping stage, the first and second damping stages remain engaged. Likewise, upon engagement of the final damping stage, the first, second, and third damping stages remain engaged. These are merely examples to define sequential engagement and are not to be viewed as limiting the scope of the subject matter disclosed herein.

FIGS. 3-6 show various aspects of a first example embodiment of a multi-stage torsional coupling, generally designated 10. In this example embodiment, the multi-stage torsional coupling includes a first damping stage, a second damping stage, a third damping stage, and a fourth, or final, damping stage. In some aspects, the second damping stage can include multiple intermediate stages that provide different stiffnesses to resist a torsional input with different stiffnesses and/or engaging at different rotary positions. In the example embodiment shown, the first damping stage of the multi-stage torsional coupling 10 is provided by an elastomeric material (e.g., an elastomeric spring, such as elastomer 140, which is a generally annularly-shaped structure). The second and third damping stages are provided by at least first and second coil spring assemblies, which can be provided as one or more intermediate stages. The fourth, or final, stage is provided by hard-mounted snubbing pads.

It is advantageous for an elastomeric material, such as rubber, to be used for the first damping stage, so that the elastomeric material provides both stiffness and damping characteristics. As such, according to the example embodiments shown in FIGS. 3-6, the first damping stage comprises an inner member 120, which is coupled to the torsional input at the hub 1. In order to maintain a rigid connection between the inner member and the rotatable structure through which the torsional input is received at the hub 1, the inner member is advantageously formed from a substantially rigid material, such as a metal or metal alloy, plastic, and the like. The multi-stage torsional coupling 10 also includes a sprocket plate 110, to which an output structure, such as a driveshaft, is rigidly attached (e.g., by welding, bolts, and the like), such that the torsional input is transmitted to the output structure through the multi-stage torsional coupling 10. The sprocket plate 110 may be made of any suitably durable and rigid material suitable for transmitting the torsional loads to the output structure. As such, the hub 1 is regarded herein as the input and the sprocket plate 110 is regarded herein as the output. In some embodiments, however, the input and the output may be reversed, such that the sprocket plate 110 receives the torsional input and the hub 1 transmits a torsional output. The first damping stage further comprises an elastomer 140 that is bonded to the outer circumferential surface of the inner member 120. In the example embodiment shown, the elastomer 140 has a substantially continuous, annular structure. The outer circumferential surface of the elastomer 140 is attached to an outer member 130. In the example embodiment shown in FIGS. 3-6, the outer member 130 is attached (e.g., rigidly, such as by welding, brazing, or any suitable attachment type) to a top stamping 150.

Figure 7:
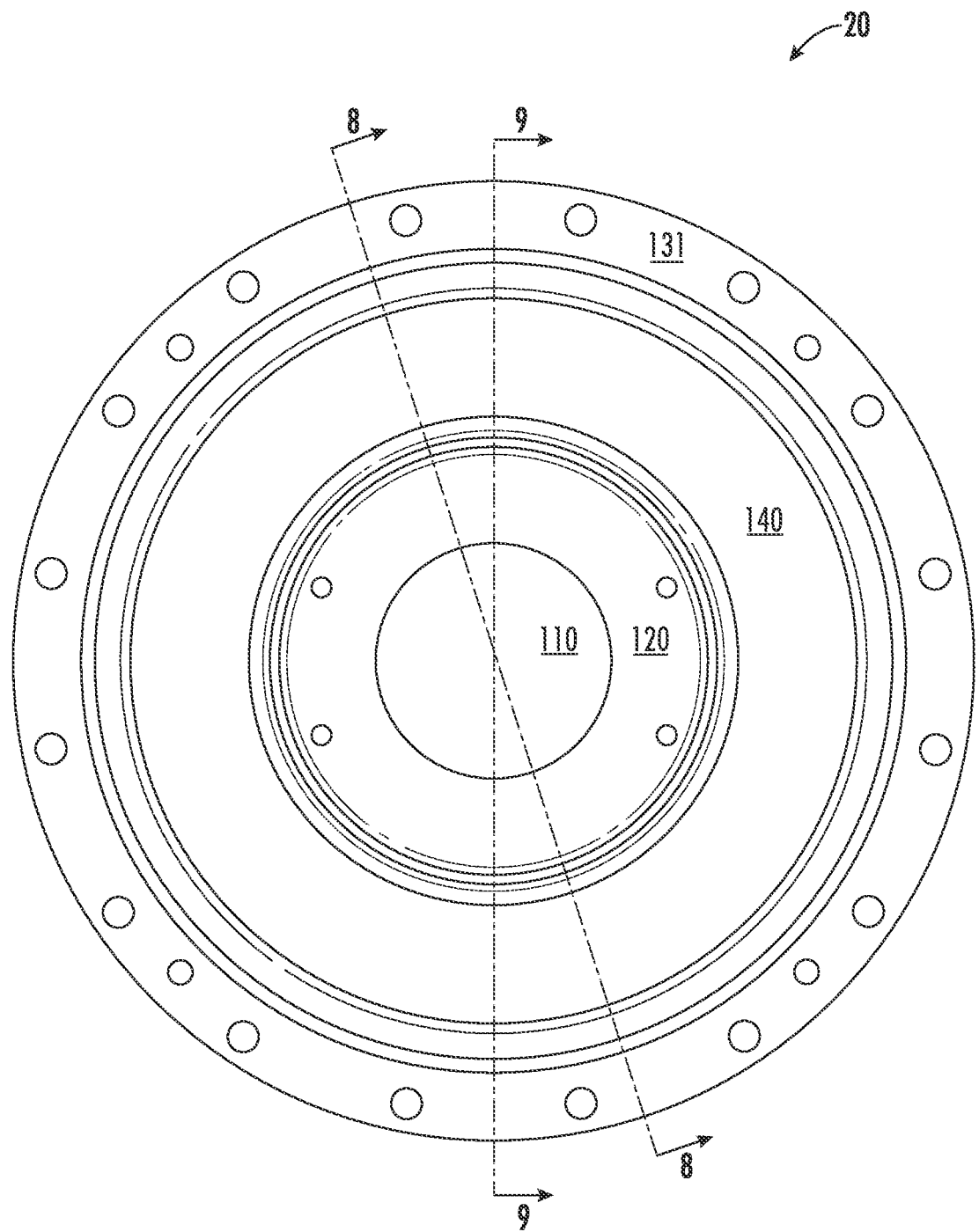
FIG. 7 is a front view of a second example embodiment of a multi-stage torsional coupling, according to the disclosure herein.
Figure 8:
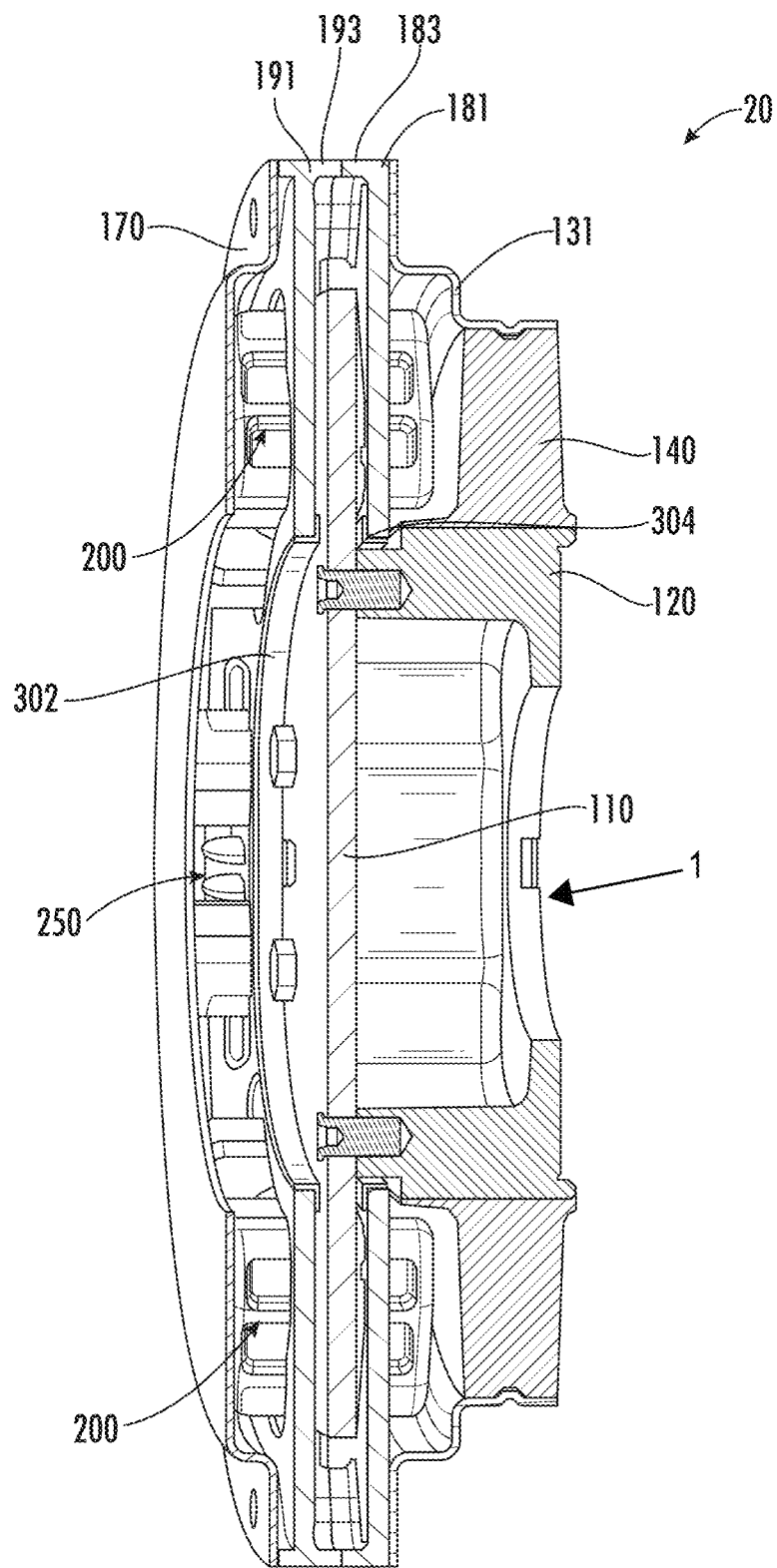
FIG. 8 is a cross-sectional side view of the second example embodiment of the multi-stage torsional coupling, taken along the section line 8-8 shown in FIG. 7, according to the disclosure herein.
Figure 9:
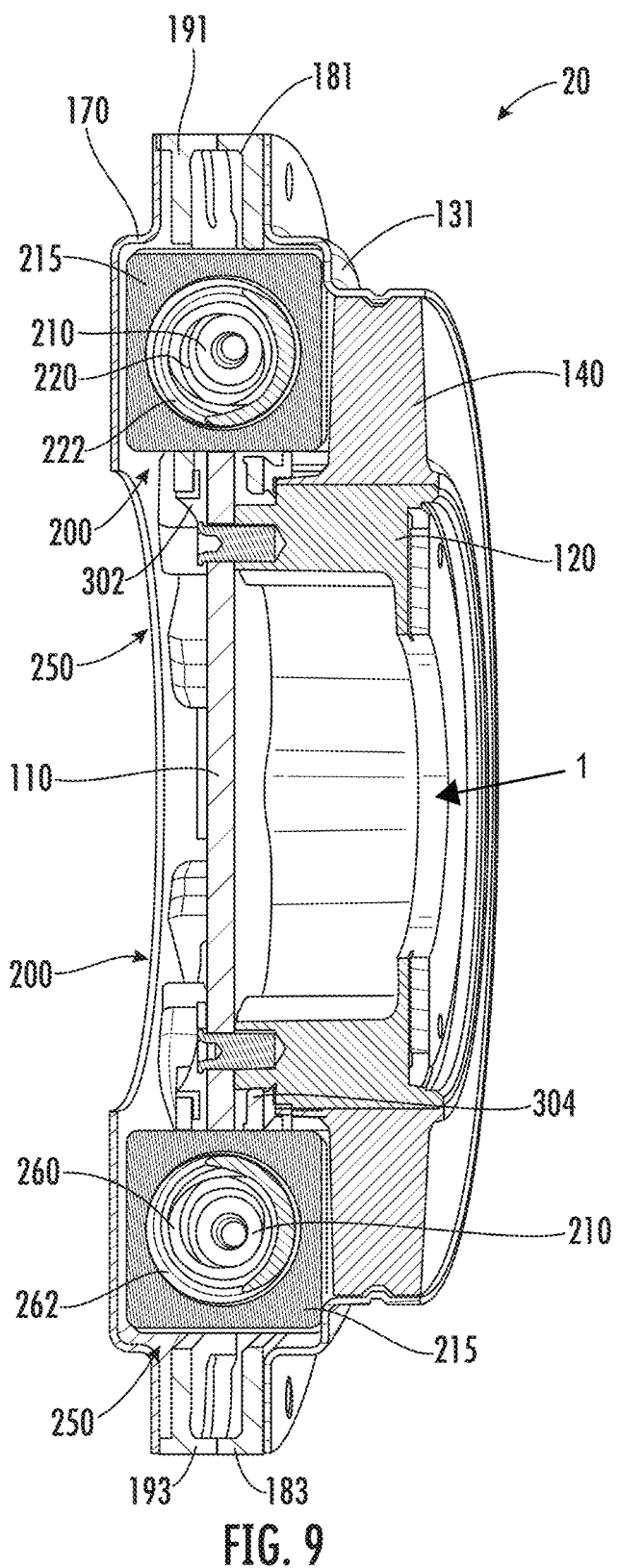
FIG. 9 is a cross-sectional side view of the second example embodiment of the multi-stage torsional coupling, taken along the section line 9-9 shown in FIG. 7, according to the disclosure herein.
Figure 10:
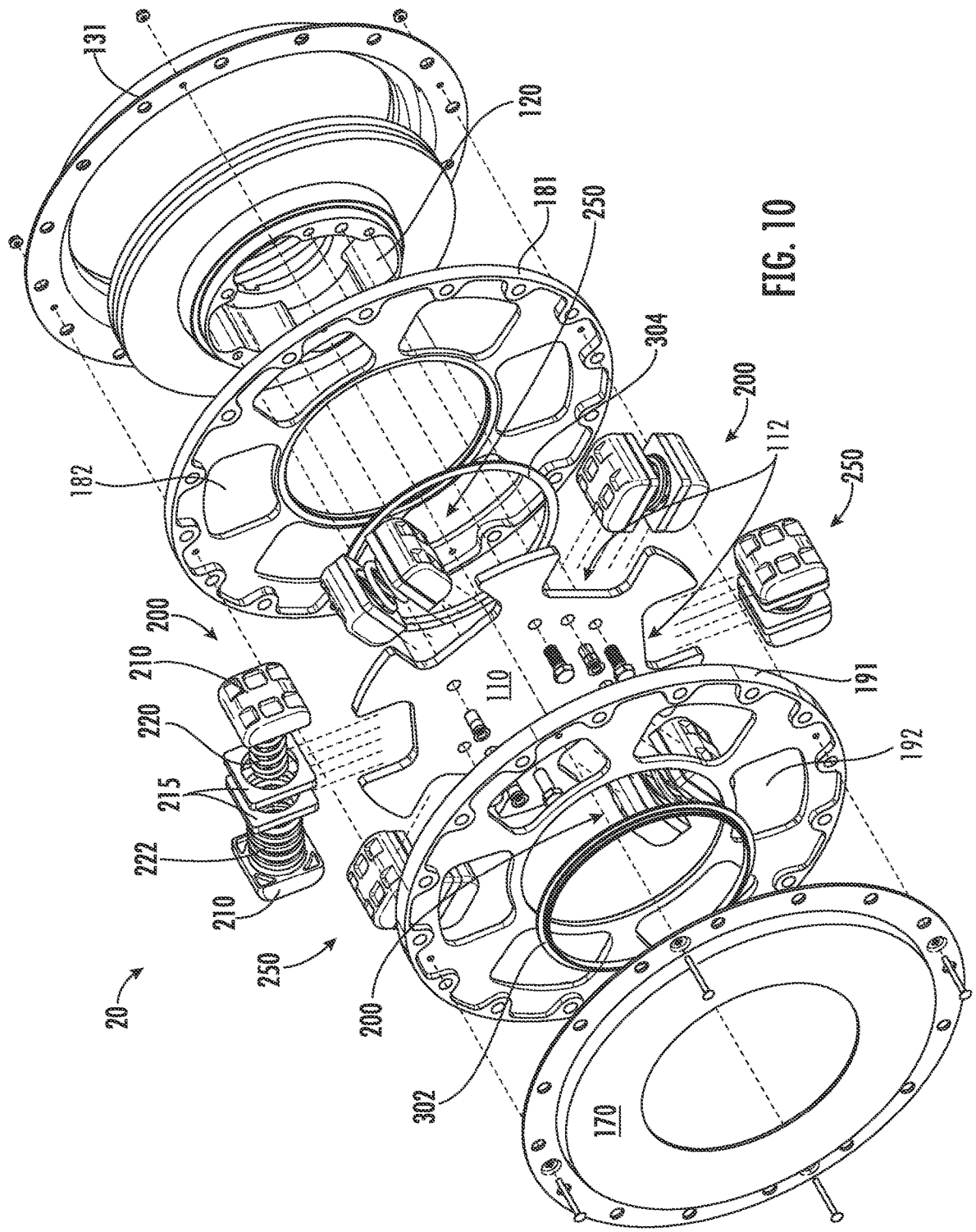
FIG. 10 is an exploded isometric view of the second example embodiment of the multi-stage torsional coupling, according to the disclosure herein.
Figure 11:
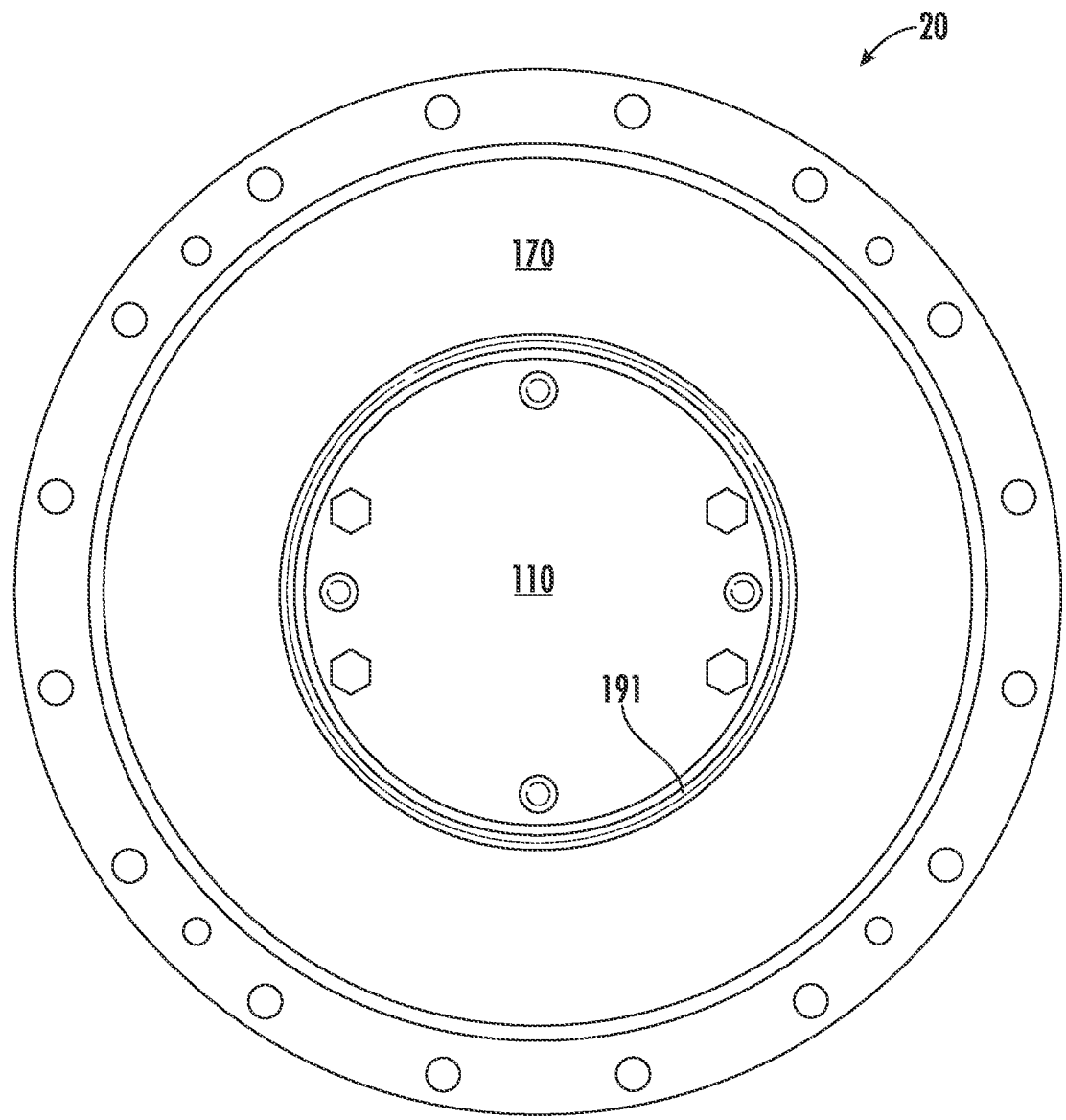
FIG. 11 is a rear view of the second example embodiment of the multi-stage torsional coupling, according to the disclosure herein.

The elastomer 140 can be made of any suitable material, including, by way of example and not limitation, natural rubber. The elastomer 140 can be formed, for example, via a vulcanized rubber that is simultaneously and/or subsequently bonded during the vulcanization process, either directly between the inner member 120 and the outer member 131 (FIGS. 7-9) or directly between the inner member 120 and the outer member 130 (FIGS. 3-6). In some embodiments, the attachment between the elastomer 140 can be press-fit within the outer member 130 (FIGS. 3-6), such that relative rotary movements between the elastomer 140 and the outer member 130 are resisted only via the frictional force acting between the elastomer 140 and the outer member 130 at the contact surfaces therebetween. In some embodiments, the elastomer 140 is press-fit between the inner member 120 and the outer member 130 (FIGS. 3-6) and/or between the inner member 120 and the outer member 131 (FIGS. 7-9), such that only frictional forces generated at the contact surface between the elastomer 140 and the inner member 120 and either the outer member 130, 131 resist relative movements between the rubber element 140 and the inner member 120 and between the rubber element 140 and the outer member 130, 131.

The elastomer 140 of the first damping stage provides a low stiffness value for providing suitable damping at a low, or idle, speed of the torsional input and is initially engaged during start-up and shut-down of the machine within and/or to which the multi-stage torsional coupling 10 is provided and/or associated, which can cause the engine and transmission, as well as other drivetrain components (e.g., a driveshaft, differential, etc.) of the machine, to "pass through" a natural frequency (e.g., a harmonic frequency at which vibration increases disproportionately to the increase in frequency). The amplitude of vibration between the rotating components that are coupled together by the multi-stage torsional coupling 10 is reduced (e.g., compared to a torsional coupling without this first damping stage) when operating at or near the natural frequency due to the damping characteristics provided by the elastomer 140. A further advantage provided by the elastomer 140 is to provide a seal for the interior of the multi-stage torsional coupling 10, where components forming the other stages are located, thereby preventing dirt and debris from entering the interior of the multi-stage torsional coupling 10. As such, the operable life of the multi-stage torsional coupling 10 is increased by preventing the components of the other stages from abrasion with foreign contaminants, such as dirt and debris, during normal operation.

The intermediate stage(s) of the multi-stage torsional coupling 10 is/are provided by one or more coil springs assemblies, which can all be substantially identical or subdivided into different "sets" or "sub-sets" thereof that have different characteristics in terms of, for example, stiffness, length, and the like. In the example embodiment shown in FIGS. 3-6, the multi-stage torsional coupling 10 includes a plurality of intermediate stages, specifically, a second damping stage and a third damping stage. The terms "intermediate stage" and "intermediate stages" can be used interchangeably herein to refer to either of the second damping stage and/or the third damping stage, either singularly or together. More than two intermediate stages may be provided by providing, for example, three or more different coil spring assemblies. The second damping stage comprises a plurality of first coil spring assemblies, generally designated 250, while the third damping stage comprises a plurality of second coil spring assemblies, generally designated 200. The first coils spring assemblies 250 are arranged circumferentially about the sprocket plate 110. The second coil spring assemblies 200 are arranged circumferentially about the sprocket plate 110. In the example embodiment shown, there are the same number first coil spring assemblies 250 and second coil spring assemblies 200. In some embodiments, there may be a greater quantity of first coil spring assemblies 250 than there are second coil spring assemblies 200. In some embodiments, there may be a greater quantity of second coil spring assemblies 200 than there are first coil spring assemblies 250. Stated differently, the multi-stage torsional coupling 10 may have a different number of first coil spring assemblies 250 than there are second coil spring assemblies 200.

The second damping stage, or the first coil spring assemblies 250, has coil springs 260, 262 that are longer than the coil springs 220, 222 of the second coil spring assemblies 200, which are associated with the third damping stage. The longer first coil spring assemblies 200 of the second damping stage engage (e.g., begin to undergo compression by relative movement between opposing ends of the coil spring holders 210, between which the longer coil springs are held captive) when the angular displacement of the inner member 120 and sprocket plate 110 rotate by a degree sufficient for the coil springs 260, 262 and coil spring holders 210 to push against a wall of the pockets formed in the upper plate 180, lower plate 190, and/or mid-plate 185. The third damping stage is made of coil springs 220, 222 that are shorter than the coil springs 260, 262 of the first coil spring assemblies. The shorter coil springs 220, 222 of the third damping stage engage (e.g., begin to undergo compression by relative movement between opposing ends of the coil spring holders 210 between which the shorter coil springs 220, 222 are held captive) when the angular displacement of the inner member 120 and sprocket plate 110 rotate by a degree sufficient for the coil springs 220, 222 and coil spring holders 210 to push against a wall of the pockets formed in the upper plate 180, lower plate 190, and/or mid-plate 185. Since the coil springs 220, 222 of the second coil spring assemblies 200 are shorter than the coil springs 260, 262 of the first coil spring assemblies 250, the second coil spring assemblies 250 that form the third damping stage will only be engaged after the first coil spring assemblies 200 that form the second damping stage have already been engaged by torsional displacement of the components of the multi-stage torsional coupling 10.

In some embodiments, the first coil spring assemblies 250 of the second damping stage and the second coil spring assemblies 200 of the third damping stage have different spring rates and/or stiffnesses (e.g., by being made of different materials, having different gages or thicknesses, and the like) from each other. In some embodiments, the first coil spring assemblies 250 of the second damping stage and the second coil spring assemblies 200 of the third damping stage have substantially similar (e.g., varying by no more than 10%) spring rates and/or stiffnesses from each other. In the example embodiment shown, the first and second coil spring assemblies 200, 250 are interspersed with each other in an alternating pattern around an entirety of the perimeter of the multi-stage torsional coupling 10. However, this arrangement is only possible when there are a same number of first and second coil spring assemblies 200, 250. In embodiments where there are different quantities of first coil spring assemblies 250 and second coil spring assemblies 200, coil spring assemblies 200, 250 of the second damping stage and/or the third damping stage may be arranged radially adjacent to each other. While it is advantageous to space the first and second coil spring assemblies 200, 250 substantially equally around the multi-stage torsional coupling, the multi-stage torsional coupling device 10 disclosed herein is not limited to such arrangements.

In the example embodiment shown, the multi-stage torsional coupling 10 uses a centering bearing, generally designated 160, that centers the inner member 120 with respect to the outer member 130. The centering bearing 160 and surrounding geometry prevent cocking of the inner member 120 relative to the outer member 130 and also limits axial movements of the inner member 120 due to axial thrust loads.

Coil springs are advantageous for use in the second and third damping stages because coil springs do not provide any (e.g., only negligible) damping characteristics, are capable of millions of fatigue cycles, and are cost effective. Each of the coil spring assemblies 200, 250 are assembled with one or more coil springs 220, 222 or 260, 262 that are held in place between respective ends by coil spring holders 210 and a snubbing pad 215, which is fixedly positioned between (e.g., at a median point between) the respective ends at which are positioned the coil spring holders 210. As such, the coil spring holders 210, the coil springs 220, 222 or 260, 262, and the snubbing pads 215 are held captively in place by the sprocket plate 110. In some embodiments, the coil spring holders 210 and/or the snubbing pads 215 may be fixedly attached (e.g., removably and/or integrally) to the sprocket plate 110. As shown, the coil spring holders 210 and snubbing pads 215 are attached radially inwardly from an outer perimeter of the sprocket plate 110. During torsional rotation of multi-stage torsional coupling 10, the second damping stage is engaged as the coil springs 260, 262 slide (e.g., extend or compress) inside a uniquely-shaped pocket 182, 192 formed in the sprocket plate 110 and the upper and lower plates 180, 190. When the multi-stage torsional coupling 10 is assembled and in a torsionally undeformed state, the pockets of the sprocket plate 110, and also of the upper and lower plates 180, 190 are aligned with each other to form a slot, in which one of the coil spring assemblies 200, 250 can be arranged.

In some embodiments, one or both of the coil spring holders 210 for a coil spring assembly 200, 250 are movably retained within the slot, to allow for the distance between the coil spring holders 210, between which the coil springs 220, 222 or 260, 262 are arranged, to vary as the sprocket plate 110 moves relative to the upper and lower plates 180, 190. Once the sprocket plate 110 has rotated by a sufficient angle of rotation, the coil spring assemblies 200, 250 begin to compress when the coil spring holders 210 thereof contact the edge of the slot. This angular displacement of the sprocket plate 110 and subsequent compression of the coil spring assemblies 200, 250 allows for the coil spring assemblies 200, 250 of the second and third damping stages to float, relative to the upper and/or lower plates 180, 190, while the elastomer 140 of the first damping stage is engaged (e.g., providing damping and being torsionally twisted to resist relative angular displacements of the inner and outer members 120, 130). The coil spring holders 210 and snubbing pads 215 prevent the coil spring assemblies 200, 250 of the second and third damping stages from contacting the surrounding plates (e.g., the sprocket plate 110, the lower plate 190, the upper plate 180, and/or the mid-plate 185, which can be made of any suitable material, such as, for example, a metal or metal alloy. It may be advantageous for grease to be used on and/or around the coil springs 220, 222, 260, 262, the coil spring holders 210, the snubbing plates 215, and the like to provide enhanced sliding and/or damping at points where these components contact each other and/or other structures of multi-stage torsional coupling 10.

Intermediate damping stages are added by designing some of the coil spring assemblies 200, 250 and uniquely-shaped pockets to engage at different rotational angles of the sprocket plate 110. All such intermediate damping stages (e.g., second, third, fourth, etc. stages, but excluding the final damping stage) provide additional stiffness to the multi-stage torsional coupling 10 as each damping stage is sequentially engaged by the further angular rotation of the sprocket plate 110 during the normal engine operation range while the transmission is in gear.

The final damping stage engages when there is a torque spike event, such as, for example, shifting gears, or engagement or disengagement of an implement, which is a torsional event (e.g., a torque spike) that requires greater stiffness than that which can be provided by all of the previously engaged damping stages (e.g., the first, second, and third damping stages). This final damping stage includes one or more snubbing pads 215 placed around the coil springs 220, 222, 260, 262, and between the coil spring holders 210 in one of the coil spring assemblies 200, 250. These snubbing pads 215 provide cushioned snubbing (e.g., direct mechanical contact to prevent further compression of the coil spring assemblies 200, 250). In some embodiments, the coil spring assemblies 200, 250 have a different number of snubbing pads 215 positioned between the respective ends of the coil spring holders 210 thereof. For example, the first coil spring assemblies 250 may each have two snubbing pads 215 and the second coil spring assemblies 200 may each have one snubbing pad 215. In some embodiments, the position(s) of the snubbing pad(s) 215 between the coil spring holders 210 is variable or fixed. In some embodiments, the position(s) of the snubbing pad(s) 215 between the coil spring holders 210 are fixed, but are closer to the ends of the coil spring holders 210 to cause snubbing to occur at lower magnitudes of angular displacement of the sprocket plate. The snubbing pads 215 provide a very high stiffness (e.g., by being fixedly mounted to the sprocket plate 110 and/or by preventing any further compression of the coil spring assemblies 200, 250) and are compressed as the coil spring holders 210 on each side of a coil spring 220, 222 or 260, 262 move towards each other. The snubbing pads 215 also prevent the coil spring assemblies 200, 250 from being compressed to such a degree that adjacent coils of the coil springs 220, 222 or 260, 262 contact each other, sometimes referred to as "going solid".

Figure 2:
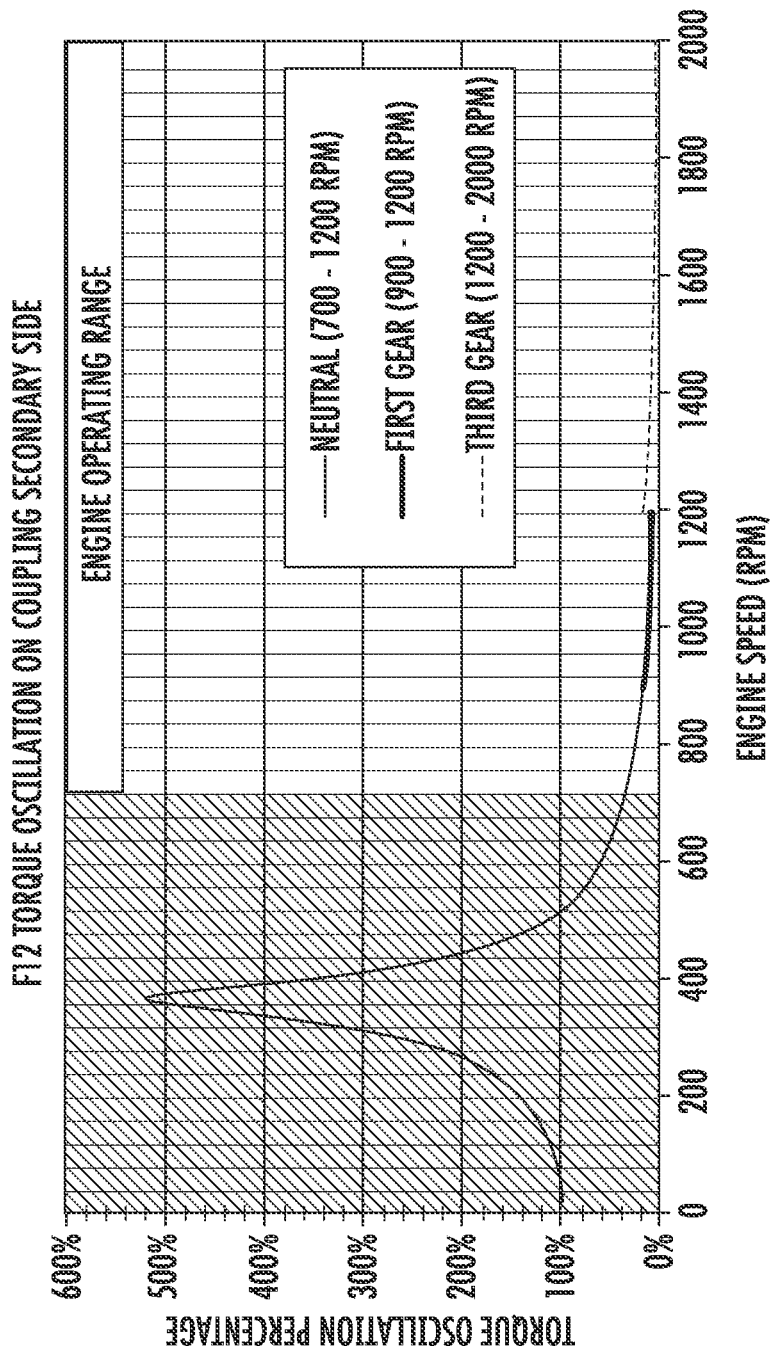
FIG. 2 is a graphical plot of a transmissibility curve for an example embodiment of a multi-stage torsional coupling.
Figure 3:
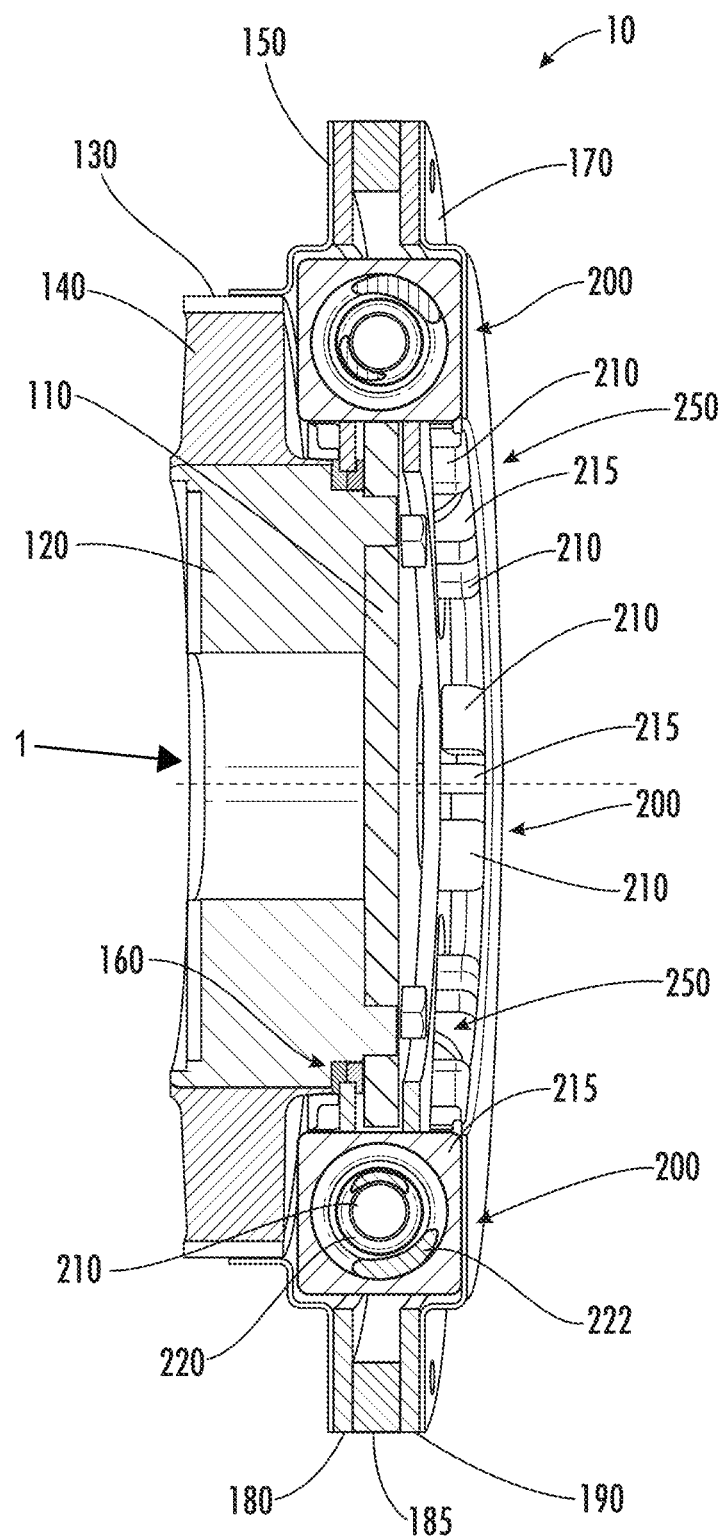
FIG. 3 is a cross-sectional side view of an example embodiment of a multi-stage torsional coupling, according to the disclosure herein.
Figure 4:
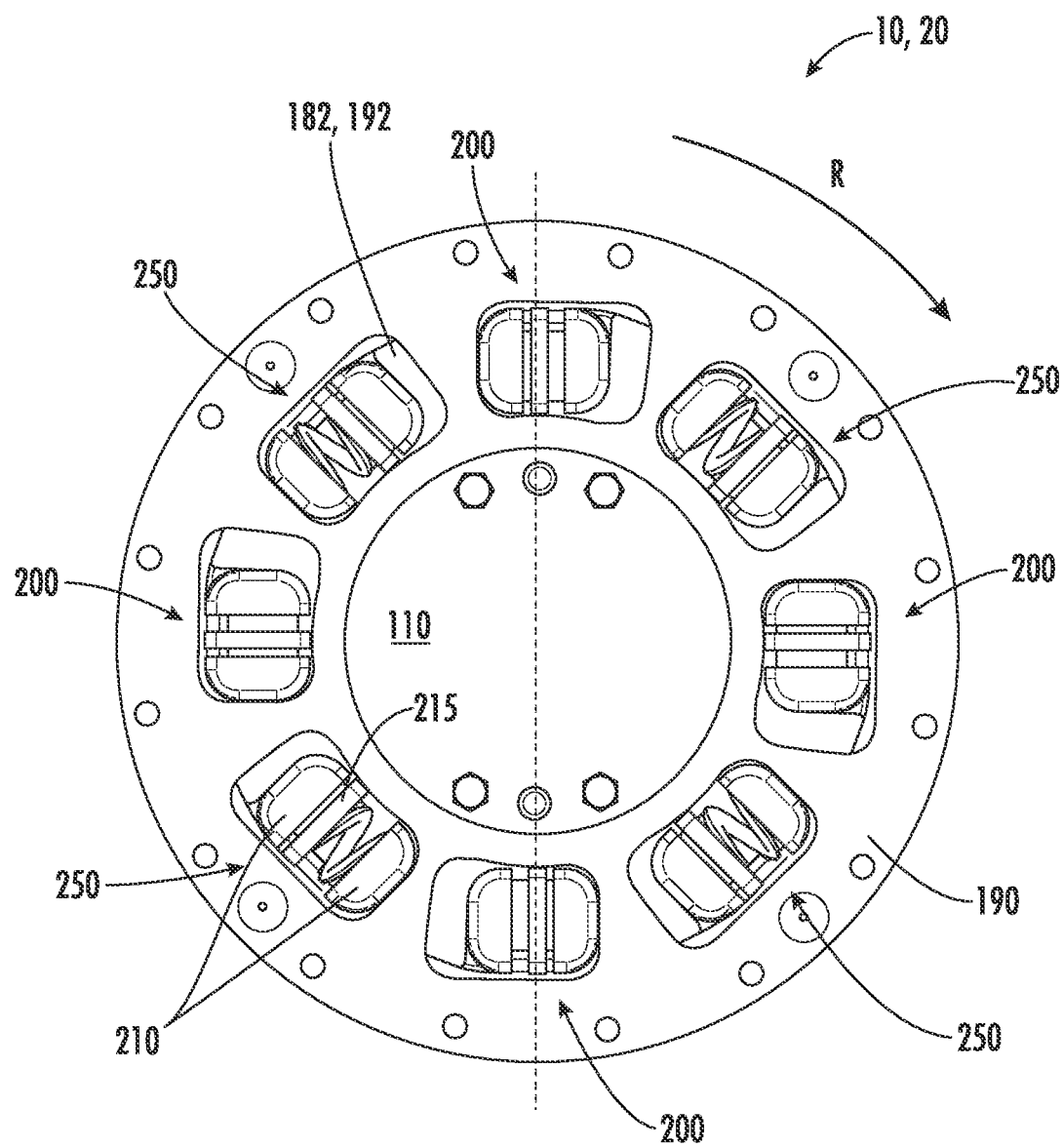
FIG. 4 is an internal front view of the multi-stage torsional coupling of FIG. 3, according to the disclosure herein.

The values and plots shown in FIGS. 1 and 2 are merely examples based on an example embodiments and persons having ordinary skill in the art will understand how to design a suitable multi-stage torsional coupling to suit a particular application having different torsional deflection and/or stiffness requirements.

As shown in FIG. 1, at or about 0 degrees of rotation of the multi-stage torsional coupling, the first damping stage (elastomeric) is engaged, such that the torsional characteristic curve has a first slope between about 0 degrees and about 4.5 degrees of rotation of the multi-stage torsional coupling. Thus, the first damping stage is engaged when the example embodiment of the multi-stage torsional coupling reacts torque inputs of between about 0 N-m and about 900 N-m.

When the example embodiment of the multi-stage torsional coupling is rotated by at least about 4.5 degrees, the second damping stage (i.e., one or more first coil spring assemblies) is engaged, such that the slope of the line between about 4.5 degrees and about 7.8 degrees is different from (e.g., greater than) the slope of the line between about 0 degrees and about 4.5 degrees. Thus, both the first and second damping stages are concurrently engaged when the example embodiment of the multi-stage torsional coupling reacts torque inputs of between about 900 N-m and about 2,200 N-m.

When the example embodiment of the multi-stage torsional coupling is rotated by at least about 7.8 degrees, the third damping stage (i.e., one or more second coil spring assemblies) is engaged, such that the slope of the line between about 7.8 degrees and about 10.4 degrees is different from (e.g., greater than) the slope of the line from about 0 degrees to about 4.5 degrees and also from about 4.5 degrees to about 7.8 degrees. Thus, each of the first, second, and third damping stages are concurrently engaged when the example embodiment of the multi-stage torsional coupling reacts torque inputs of between about 2,200 N-m and about 4,700 N-m.

When the example embodiment of the multi-stage torsional coupling is rotated by at least about 10.4 degrees, the final damping stage (i.e., a set of snubbing elements that prevent further compression of the first and/or second coil spring assemblies) is engaged, such that the slope of the line when the torsional rotation is greater than about 10.4 degrees is different from (e.g., greater than) the slope of the line from about 0 degrees to about 4.5 degrees, from about 4.5 degrees to about 7.8 degrees, and also from about 7.8 degrees to about 10.4 degrees. Thus, each of the first, second, third, and final damping stages are concurrently engaged when the example embodiment of the multi-stage torsional coupling reacts torque inputs greater than about 4,700 N-m. The plot of the torsional characteristic curve shown in FIG. 1 is terminated about the maximum shift shock torque, which is the maximum design torsional input limit for the example embodiment of the multi-stage torsional coupling for which the torsional characteristic curve is generated.

FIG. 2 is an example graphical plot of torque oscillation as a percentage value (y-axis) vs. engine speed (x-axis). Thus, the transmissibility curve shown in FIG. 2 corresponds to the transmissibility curve for the multi-stage torsional coupling 10 shown in FIGS. 3-6. The transmissibility curve shows the amount of torsional vibration transmitted for an agricultural tractor application in Neutral, first, and third gears, having an ultra-low idle speed of 700 revolutions per minute (rpm) and a maximum engine speed of 2000 rpm. The gears shown in FIG. 2 are merely examples and are not limiting. FIG. 2 shows that the torque oscillation increases to over 500% during engine startup, however, reaching this peak value at about 370 rpm. Thus, it is anticipated that the largest torque inputs will occur during engine startup.

A second example embodiment of a multi-stage torsional coupling, generally designated 20, is shown in FIGS. 7-11. The functionality and operation of the multi-stage torsional coupling 20 is generally similar to that of the multi-stage torsional coupling 10 shown in FIGS. 3-6. As such, features of the multi-stage torsional coupling 20 that are not expressly described as being different from the description thereof elsewhere herein are substantially similar to those of the multi-stage torsional coupling 10 and a description of such substantially similar features will not be repeated herein.

The multi-stage torsional coupling 20 has a plurality of coil spring assemblies, which are subdivided into two "sets" of coil spring assemblies, first coil spring assemblies 250 and second coil spring assemblies 200. While any suitable quantity of first coil spring assemblies 250 may be provided and any suitable quantity of second coil spring assemblies 200 may be provided in the multi-stage torsional coupling 20, in the example embodiment shown in FIGS. 7-11, the multi-stage torsional coupling 20 has three (3) first coil spring assemblies 250 and three (3) second coil spring assemblies 200. The multi-stage torsional coupling 20 may have, however, the quantity of first coil spring assemblies 250 may be different than the quantity of second coil spring assemblies 200. The first and second coil spring assemblies 200, 250 in the multi-stage torsional coupling 20 are substantially identical to those used in the multi-stage torsional coupling 10. Each of the first and second coil spring assemblies 200, 250 has one or more (e.g., two in the multi-stage torsional coupling 20) coil springs 220, 222 or 260, 262 contained between two (2) coil spring holders 210.

Unlike in the multi-stage torsional coupling 10, the multi-stage torsional coupling 20 includes a single-piece outer member 131 that operates substantially identically to the outer member 130 and the upper stamping 150 of the multi-stage torsional coupling 10. The use of a single-piece outer member 131 is advantageous at least for the reason that no assembly or attachment of the outer member 130 and the upper stamping 150 is necessary in the multi-stage torsional coupling 20, a process which was achieved in the multi-stage torsional coupling 10 using a secondary manufacturing process, such as welding, brazing, applying fasteners, and the like. As such, assembly of the multi-stage torsional coupling 20 is simplified, the assembly time is reduced, and the costs associated with the multi-stage torsional coupling 20 are reduced by using the single-piece outer member 131.

Additionally, the multi-stage torsional coupling 20 lacks a mid-plate (185, FIGS. 3-6) and instead comprises an upper plate 181 and a lower plate 191 that each have an outer flange 183, 193 that extends in the direction of the opposing plate by a distance of approximately half of the thickness of the mid-plate (185) to ensure that respective surface of the upper and lower plates 181, 191 in which the pockets 182, 192 are formed are spaced apart by a distance that is greater than a thickness of the sprocket plate 110, such that the sprocket plate 110 does not directly contact either the upper plate 181 or the lower plate 191. The omission of the mid-plate (185) from the multi-stage torsional coupling 20 can be advantageous at least for the reason that assembly of the upper and lower plates 181, 191 together is aided by the use of fewer parts that must be assembled, thereby resulting in faster assembly and lower cost.

The multi-stage torsional coupling 20 also include a centering bearing, which is functionally similar to the centering bearing (160, FIGS. 3-6) of the multi-stage torsional coupling 10. However, the structure of the centering bearing of the multi-stage torsional coupling 20 is different and is in the form of a split bearing with an upper race 304 and a lower race 302 that are arranged on opposite sides of the sprocket plate 110. The upper race 304 engages with, and is shaped substantially identically to, the inner circumferential surface of the upper plate 181. The lower race 302 engages with, and is shaped substantially identically to, the inner circumferential surface of the lower plate 191. Thus, if the sprocket plate 110 becomes cocked, or inclined, relative to either of the upper or lower plates 181, 191 during operation (e.g., from a torsional input) or otherwise an axial thrust force is received by the multi-stage torsional coupling 20 that would cause the sprocket plate 110 to move towards one of the upper or lower plates 181, 191, the sprocket plate will contact the upper or lower race 302, 304 towards which it is being displaced. As such, the upper race 304 generally prevents direct contact between the sprocket plate 110 and the upper plate 181 and the lower race 302 generally prevents direct contact between the sprocket plate 110 and the lower plate 191.

Furthermore, because the upper race 304 is fitted about (e.g., in direct contact with) the inner member 120, the upper race 304 limits (e.g., partially or entirely) relative radial movements of the upper plate 181 relative to the inner member 120. Thus, since the upper plate 181 is rigidly attached to the outer member 131, the lower plate 191, and the lower stamping 170, the upper race also limits (e.g., partially or entirely) relative radial movements of the outer member 131, the lower plate 191, and the lower stamping 170 relative to the inner member 120. Accordingly, the upper race 304 is provided to limit relative axial and radial movements between a first rigidly assembled structure, comprising each of the upper plate 181, the outer member 131, the lower plate 191, and the lower stamping 170, and a second rigidly assembled structure, comprising each of the inner member 120 and the sprocket plate 110. The lower race 302 is provided primarily to limit only axial movements between the first rigidly assembled structure, comprising each of the upper plate 181, the outer member 131, the lower plate 191, and the lower stamping 170, and the second rigidly assembled structure, comprising each of the inner member 120 and the sprocket plate 110. Therefore, the upper and lower races 302, 304 are provided such that the primary degree of freedom (e.g., allowable movement) between the first rigidly assembled structure and the second rigidly assembled structure is in the circumferential direction (e.g., in the direction in which relative movement would be induced by a torsional input load was received, for example, at the inner member 120.

One disadvantage associated with known multi-stage torsional couplings is sealing the internal volume thereof, as well as the components contained therein, from dirt and debris to prevent their entry from the transmission side of the coupling. According to one advantage of the presently disclosed example embodiments of the multi-stage torsional coupling 10, 20, the first damping stage elastomer 140 and the rigid connection (e.g., using fasteners, such as rivets, bolts, screws, and the like) between the inner member 120 and the sprocket plate 110 also prevents any environmental contaminants, such as dirt, debris, foreign objects, and the like, from entering the internal volume within the multi-stage torsional coupling 10, 20 that houses the coil spring assemblies 200, 250.

A method of providing variable torsional stiffness between coupled devices, using a multi-stage torsional coupling, is also provided. According to a first example embodiment (e.g., corresponding to multi-stage torsional coupling 10), the sprocket plate 110 is rigidly attached to the inner member 120 to prevent relative movements therebetween. The outer member 130 is then assembled with (e.g., in a press-fit manner or using any other suitable type of attachment) the top stamping 150. An elastomer 140 is attached between the outer circumferential surface of the inner member 120 and the inner circumferential surface of the outer member 130. Next, the outer member 130, top stamping 150, upper plate 180, mid-plate 185, lower plate 190, and bottom stamping 170 are assembled together to form a first rigidly assembled structure, such that the sprocket plate 110 is positioned between the upper plate 180 and the lower plate 190. The structures of the first rigidly assembled structure are then rigidly attached (e.g., using bolts) to a first torsional connection (e.g., the flywheel of an engine). A second torsional connection (e.g., a transmission driveshaft) is then attached to the inner member 120. Torque is received at the inner member 120 through the second torsional connection. A torque, or angular movement, of the inner member 120 can also be transmitted to the sprocket plate 110.

According to a second example embodiment of a method of providing variable torsional stiffness between coupled devices (e.g., corresponding to multi-stage torsional coupling 20), the sprocket plate 110 is rigidly attached to the inner member 120 to prevent relative movements therebetween. The outer member 131 is formed as a single-piece (e.g., in a unitary, or monolithic manner). An elastomer 140 is attached between the outer circumferential surface of the inner member 120 and the inner circumferential surface of the outer member 131. Next, the outer member 131, upper plate 181, lower plate 191, and bottom stamping 170 are assembled together to form a first rigidly assembled structure, such that the sprocket plate 110 is positioned between the upper plate 181 and the lower plate 191. During assembly of the structures of the first rigidly assembled structure, the upper race 304 is inserted within the inner circumferential edge of the upper plate 181 and the lower race 302 is inserted within the inner circumferential edge of the lower plate 191, such that the respective surface of the lower race 302 and upper race 304 that contacts the sprocket plate 110 to prevent direct contact between the sprocket plate 110 and the lower plate 191 and upper plate 181, respectively, is adjacent to (e.g., on the same side of the upper plate 181 as) the sprocket plate 110. The structures of the first rigidly assembled structure are then rigidly attached (e.g., using bolts) to a first torsional connection (e.g., the flywheel of an engine). A second torsional connection (e.g., a transmission driveshaft) is then attached to the inner member 120. Torque is received at the inner member 120 through the second torsional connection. A torque, or angular movement, of the inner member 120 can also be transmitted to the sprocket plate 110.

When only the first damping stage is engaged (e.g., when only the elastomer 140 is engaged), the coil spring assemblies 200, 250 all co-rotate with the sprocket plate 110. Thus, there is no relative movement between any of the components of the coil spring assemblies 200, 250 when only the first damping stage is engaged. However, when the first damping stage is engaged, the elastomer 140 is torsionally deflected and/or deformed by the relative movement between the inner member 120 and the outer member 130.

As the sprocket plate 110 and the coil spring assemblies 200, 250 co-rotate together when only the first damping stage is engaged, one end of coil spring holders 210 of the first coil spring assemblies 250 (e.g., the second damping stage) in the direction of rotation of the sprocket plate 110 and the torsional input will contact the edge of the slot defined by the pockets 181, 192 of the upper and lower plates 180, 190 in which such first coil spring assembly 250 is disposed. This co-rotation of the coil spring assemblies 200, 250 and the sprocket plate 110 occurs between the positions shown in FIGS. 5A and 5B. As shown in FIG. 5B, one end of each of the coil spring holders 210 of the first coil spring assemblies 250 contacts the upper and/or lower plates 180, 190 at the ends of the pockets 182, 192 in which the first coil spring assemblies 250 are disposed, but none of the coil spring holders 210 in any of the second coil spring assemblies 200 (e.g., associated with the third damping stage) are in contact with the upper and/or lower plates 180, 190 at the ends of the pockets 182, 192 in which the second coil spring assemblies 200 are disposed. As such, the second coil spring assemblies 200 of the third damping stage remain "floating" within the slot formed by the respective pockets 112, 182, 192 of the sprocket plate 110, upper plate 180, and lower plate 190. Therefore, the second coil spring assemblies 200 are spaced apart from, and not in contact with, either of the ends of the pockets 182, 192 of the upper and lower plates 180, 190 in which they are disposed (e.g., having gaps on either ends of the coil spring holders 210 of the second coil spring assemblies 250 in both circumferential directions).

Figure 5A:
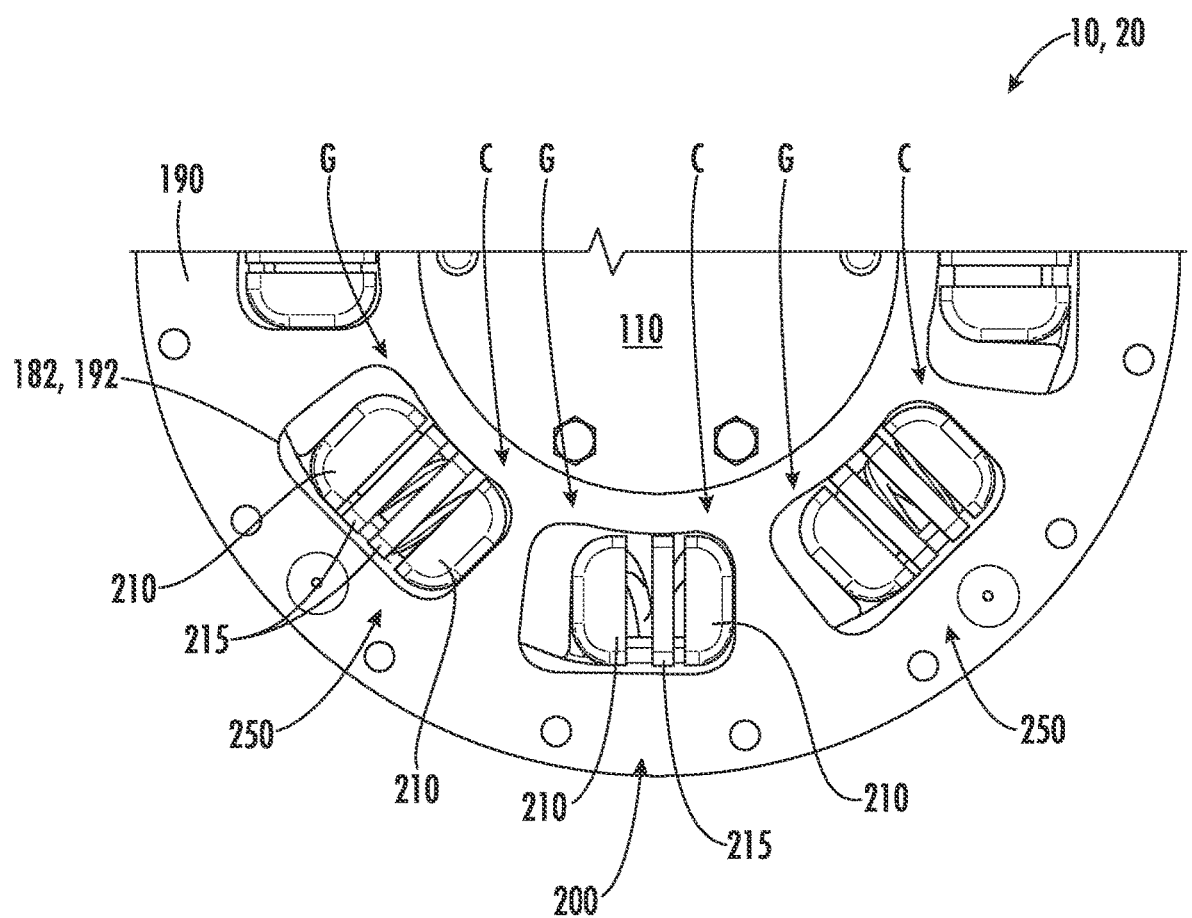
FIGS. 5A, 5B and 5C are partial from views of the multi-stage torsional coupling of FIGS. 3 and 4, showing the rotation of the sprocket plate relative to the lower plate, mid-plate, and upper plate, according to the disclosure herein.
Figure 5B:
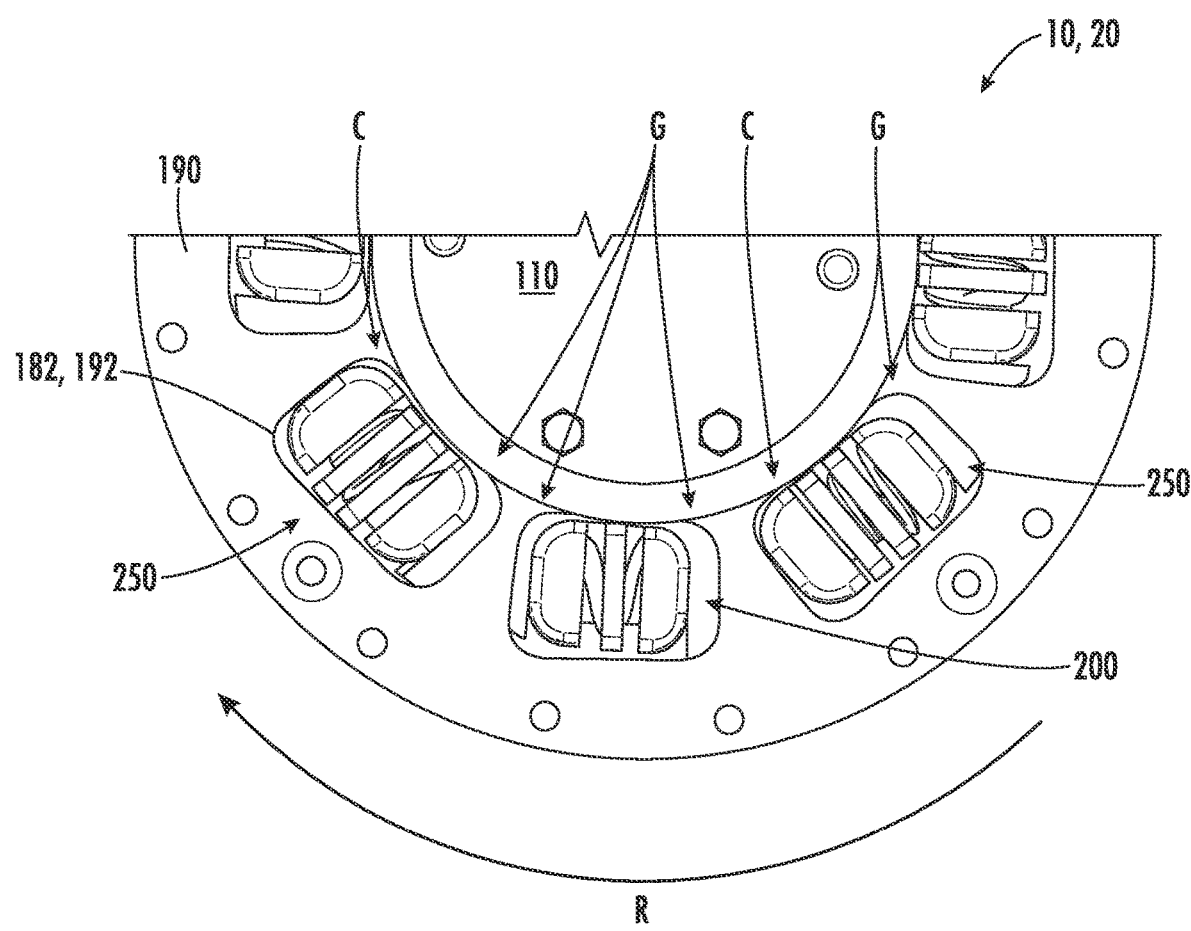
Figure 5C:
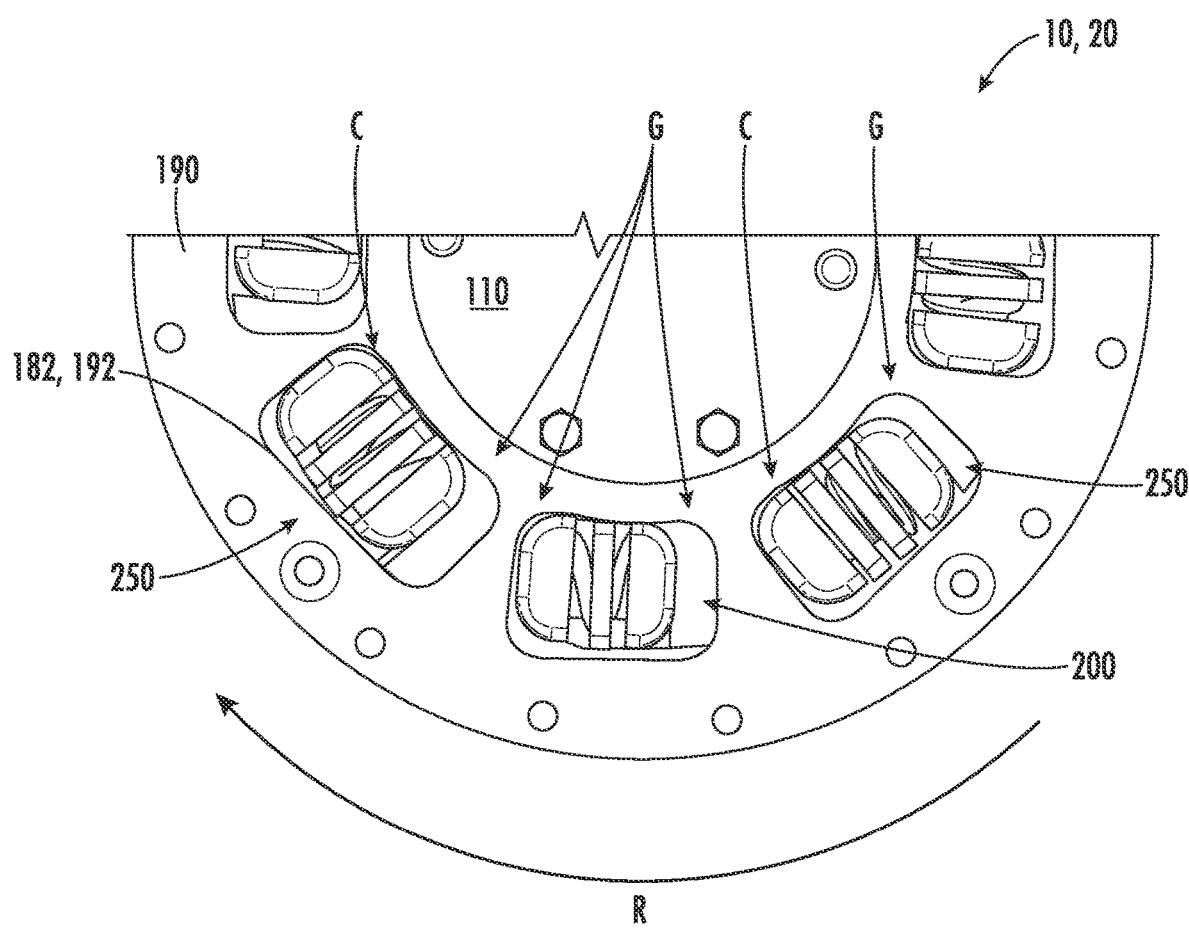
Figure 6:
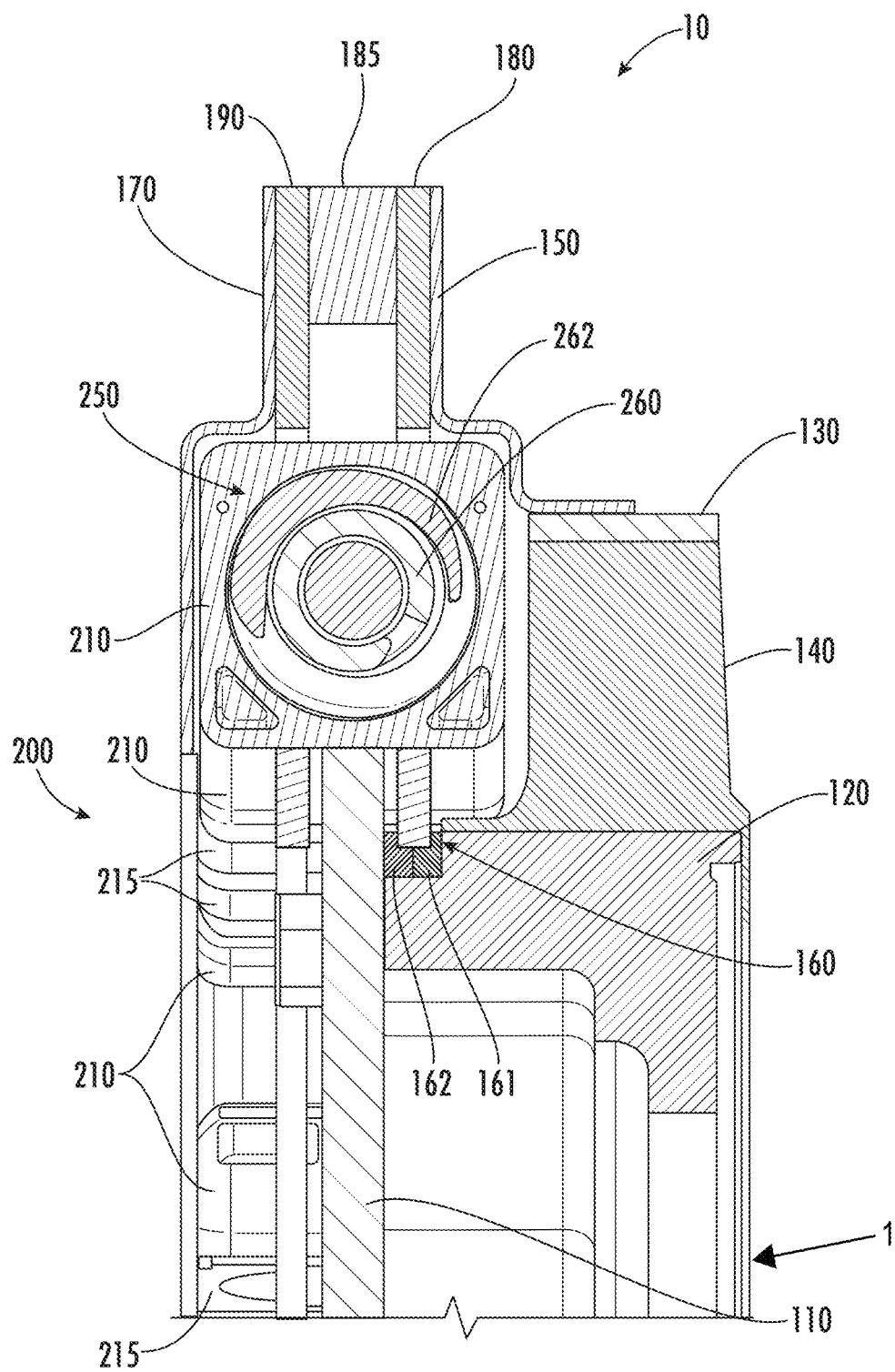
FIG. 6 is a partial cross-sectional side view of the multi-stage torsional coupling of FIGS. 3 and 4, according to the disclosure herein.

As such, FIG. 5A shows an initial, undeflected position, in which only the first damping stage is engaged, but in which the elastomer 140 of the first damping stage is not torsionally displaced (e.g., not beyond an initial, or static, torsional displacement). In FIG. 5B, the elastomer 140 of the first damping stage is rotationally displaced and torsionally displaced (e.g., deformed), with the inner member 120 being rotated by about 4.5 degrees relative to, for example, the outer member 130, 131, as well as other structures rigidly attached thereto, in the example embodiment shown. The angular displacements and any other design parameters discussed herein are merely examples and are not to be used in limiting the scope of the disclosure herein. In FIG. 5B, the coil spring holder of each of the first coil spring assemblies 250 of the second damping stage is in contact with (e.g., is not gapped apart from) the edge in the direction of the torsional input in the pockets 182, 192 that are formed in the upper and lower plates 180, 190 or 181, 191. FIG. 5C shows that the inner member 120 has been rotated further in the direction of rotation (e.g., in the direction of the torsional input) than is shown in FIG. 5B. In FIG. 5C, the inner member 120 has been rotated by about 7.9 degrees (e.g., by about 3.4 degrees further than in the relative positions shown in FIG. 5B) from the position shown in FIG. 5A. In the position shown in FIG. 5C, the coil spring holder in the direction of rotation of each (e.g., every) coil spring assembly 200, 250 is in contact with (e.g., is not gapped, or spaced, apart from) the edge in the pockets 182, 192 formed in the upper and lower plates 180, 190 or 181, 191. At the position of FIG. 5C, the first coil spring assemblies 250 of the second damping stage are compressed, but this compression of the spring is not shown in FIG. 5C due limitations in illustrating this feature in the computer models shown herein. In FIG. 5C, the first coil spring assemblies 250 of the second damping stage are compressed, but the second coil spring assemblies 200 of the third damping stage are uncompressed. Any further rotation of the inner member 120 beyond about 7.9 degrees causes the coil spring assemblies 200, 250 of the second and third damping stages to be compressed simultaneously (i.e., at the same time), but at different rates and/or percentages of compression.

When a torque spike is received by either torsional input of the multi-stage torsional coupling 10, 20, such as, for example, when shifting gears or when an implement (e.g., of a farm tractor) is engaged or disengaged, the coil spring assemblies 200, 250 of each of the second and third damping stages all shorten to a minimum length and the distance between the ends of the respective coil spring holders 210 decreases to a minimum value, at which the inner flanges of each coil spring holder 210 of a coil spring assembly 200, 250 contact and are compressed against the snubbing pads 215. The provision of multiple snubbing pads 215 between the coil spring holders 210 of a coil spring assembly 200, 250 can be used to control the minimum value of the compression of the coil spring assembly 200, 250, thereby preventing over-compression of the one or more coil springs contained within each coil spring assembly 200, 250. During operation, the centering bearing 160 or 302, 304 reacts axial thrust forces, radial forces, and prevents cocking (e.g., non-planarity) of the inner member 120 and sprocket plate 110 relative to other components of the multi-stage torsional coupling 10, 20.

Other embodiments of the current invention will be apparent to those skilled in the art from a consideration of this specification or practice of the invention disclosed herein. Thus, the foregoing specification is considered merely an example of the current invention with the true scope thereof being defined by the following claims.

What is claimed is:

1. A multi-stage torsional coupling comprising:
   an inner member;
   a sprocket plate connected to the inner member;
   one or more plates;
   an outer member rigidly attached to the one or more plates; and
   a plurality of damping stages that are arranged for sequential engagement by movement of the sprocket plate relative to the one or more plates to provide a variable stiffness over a range of angular displacement for the multi-stage torsional coupling;
   wherein the plurality of damping stages comprises at least a first damping stage and a second damping stage;
   wherein the second damping stage comprises one or more first coil spring assemblies, each of which comprises one or more coil springs;
   wherein:
      the inner member is connected to a first torsional connection and the one or more plates is/are connected to a second torsional connection; or
      wherein the inner member is connected to the second torsional connection and the one or more plates is/are connected to the first torsional connection; and
   wherein the sprocket plate is configured to rotate relative to the one or more plates to sequentially engage the plurality of damping stages to provide stiffness between the first and second torsional connections that increases in a non-linear, or stepped, manner as the amplitude of the angular displacement of the sprocket plate relative to the one or more plates increases.

2. The multi-stage torsional coupling of claim 1, wherein the stiffness provided by the plurality of damping stages increases disproportionately to a rate of increase of the amplitude of the angular displacement of the sprocket plate relative to the one or more plates.

3. The multi-stage torsional coupling of claim 1, wherein the first damping stage comprises an elastomeric material between the inner member and the outer member, wherein the elastomeric material is configured for torsional deformation as the inner member and the outer member rotate relative to each other and for damping vibrations and/or movement between the inner member and the outer member.

4. The multi-stage torsional coupling of claim 1, wherein:
   in the second damping stage, each of the one or more first coil spring assemblies is arranged within one of a plurality of pockets formed in and circumferentially about the sprocket plate;
   the one or more plates have pockets formed therein, the pockets being spaced circumferentially about the sprocket plate and extending in a circumferential direction of the sprocket plate;
   the pockets of the sprocket plate and the pockets of the one or more plates are aligned with each other when the multi-stage torsional coupling is in an undeflected state to define a plurality of slots, each of the one or more first coil spring assemblies being arranged within a corresponding slot of the plurality of slots; and
   an angular displacement of the sprocket plate relative to the one or more plates causes each of the one or more first coil spring assemblies to move in the circumferential direction of the sprocket plate along a length of the slot in which each of the one or more first coil spring assemblies is positioned and/or, when the angular displacement of the sprocket plate relative to the one or more plates causes the slot to have a length that is shorter than an uncompressed length of the one or more first coil spring assemblies, to compress the one or more coil springs of the one or more first coil spring assemblies between opposing ends of the slot, as defined by contact of the one or more first coil spring assemblies with the sprocket plate and the one or more plates.

5. The multi-stage torsional coupling of claim 4, wherein each of the one or more first coil spring assemblies are positioned between coil spring holders that are slidably positioned within each slot in which one of the one or more first coil spring assemblies is arranged, wherein the coil spring holders compress the one or more coil springs positioned therebetween after one of the coil spring holders, in a direction of rotation of the sprocket plate, makes contact with an end of the slot in which such coil spring holder is positioned to engage the second damping stage.

6. The multi-stage torsional coupling of claim 4, wherein the plurality of damping stages comprises a final damping stage, which comprises snubbing pads that limit an axial compression of the one or more first coil spring assemblies.

7. The multi-stage torsional coupling of claim 4, wherein:
   the plurality of damping stages comprises a third damping stage, which comprises one or more second coil spring assemblies, each of which comprises one or more coil springs and is arranged within one of the plurality of pockets formed in and circumferentially about the sprocket plate;
   each of the one or more second coil spring assemblies is arranged within a corresponding slot of the plurality of slots defined by alignment of the pockets of the one or more plates and the pockets of the sprocket plates; and
   an angular displacement of the sprocket plate relative to the one or more plates causes each of the one or more second coil spring assemblies to move in the circumferential direction of the sprocket plate along a length of the slot in which each of the one or more second coil spring assemblies is positioned and/or, when the angular displacement of the sprocket plate relative to the one or more plates causes the slot to have a length that is shorter than an uncompressed length of the one or more second coil spring assemblies, to compress the one or more coil springs of the one or more second coil spring assemblies between opposing ends of the slot, as defined by contact of the one or more second coil spring assemblies with the sprocket plate and the one or more plates.

8. The multi-stage torsional coupling of claim 7, wherein each of the one or more second coil spring assemblies are positioned between coil spring holders that are slidably positioned within each slot in which one of the one or more second coil spring assemblies is arranged, wherein the coil spring holders compress the one or more coil springs positioned therebetween after one of the coil spring holders, in the direction of rotation of the sprocket plate, makes contact with an end of the slot in which such coil spring holder is positioned to engage the third damping stage.

9. The multi-stage torsional coupling of claim 7, wherein the one or more second coil spring assemblies of the third damping stage are shorter than the one or more first coil spring assemblies of the second damping stage, such that the one or more first coil spring assemblies of the second damping stage are compressed at a lower amplitude relative angular displacement between the one or more plates and the sprocket plate than the one or more second coil spring assemblies of the third damping stage, such that the second damping stage and the third damping stage are engaged sequentially as the sprocket plate is rotated relative to the one or more plates.

10. The multi-stage torsional coupling of claim 7, wherein the plurality of damping stages comprises a final damping stage, which comprises snubbing pads that limit an axial compression of the one or more first coil spring assemblies and/or the one or more second coil spring assemblies.

11. The multi-stage torsional coupling of claim 1, wherein the first torsional connection comprises an engine flywheel.

12. The multi-stage torsional coupling of claim 1, wherein the second torsional connection comprises a transmission driveshaft.

13. The multi-stage torsional coupling of claim 1, comprising a centering bearing configured to react axial thrust forces and radial forces and to prevent cocking of the sprocket plate relative to the outer member.

14. The multi-stage torsional coupling of claim 13, wherein the centering bearing is a split bearing, having a first race in direct contact with a top plate of the one or more plates and a second race in direct contact with a bottom plate of the one or more plates, wherein the first race is on an opposite side of the sprocket plate from the second race.

15. A method of providing variable stiffness in a torsional coupling, the method comprising:
providing a multi-stage torsional coupling comprising:
an inner member;
a sprocket plate connected to the inner member;
one or more plates;
an outer member rigidly attached to the one or more plates; and
a plurality of damping stages that are arranged for sequential engagement by movement of the sprocket plate relative to the one or more plates to provide a variable stiffness over a range of angular displacement for the multi-stage torsional coupling;
wherein the plurality of damping stages comprises at least a first damping stage and a second damping stage;
wherein the second damping stage comprises one or more first coil spring assemblies, each of which comprises one or more coil springs;
wherein:
the inner member is connected to a first torsional connection and the one or more plates is/are connected to a second torsional connection; or
wherein the inner member is connected to the second torsional connection and the one or more plates is/are connected to the first torsional connection; and
rotating the sprocket plate relative to the one or more plates to sequentially engage the plurality of damping stages to provide stiffness between the first and second torsional connections that increases in a non-linear, or stepped, manner as the angular displacement of the sprocket plate relative to the one or more plates increases.

16. The method of claim 15, wherein the stiffness provided by the plurality of damping stages increases disproportionately to a rate of increase of the angular displacement of the sprocket plate relative to the one or more plates.

17. The method of claim 15, wherein the first damping stage comprises an elastomeric material between the inner member and the outer member, the method comprising rotating the inner member relative to the outer member to torsionally deform the elastomeric material and damp vibrations and/or movement between the inner member and the outer member.

18. The method of claim 15, wherein:
in the second damping stage, each of the one or more first coil spring assemblies is arranged within one of a plurality of pockets formed in and circumferentially about the sprocket plate;
the one or more plates have pockets formed therein, the pockets being spaced circumferentially about the sprocket plate and extending in a circumferential direction of the sprocket plate;
the pockets of the sprocket plate and the pockets of the one or more plates are aligned with each other when the multi-stage torsional coupling is in an undeflected state to define a plurality of slots, each of the one or more first coil spring assemblies being arranged within a corresponding slot of the plurality of slots; and
an angular displacement of the sprocket plate relative to the one or more plates causes each of the one or more first coil spring assemblies to move in the circumferential direction of the sprocket plate along a length of the slot in which each of the one or more first coil spring assemblies is positioned and/or, when the angular displacement of the sprocket plate relative to the one or more plates causes the slot to have a length that is shorter than an uncompressed length of the one or more first coil spring assemblies, to compress the one or more coil springs of the one or more first coil spring assemblies between opposing ends of the slot, as defined by contact of the one or more first coil spring assemblies with the sprocket plate and the one or more plates.

19. The method of claim 18, wherein each of the one or more first coil spring assemblies are positioned between coil spring holders that are slidably positioned within each slot in which one of the one or more first coil spring assemblies is arranged, wherein the coil spring holders compress the one or more coil springs positioned therebetween after one of the coil spring holders, in a direction of rotation of the sprocket plate, makes contact with an end of the slot in which such coil spring holder is positioned to engage the second damping stage.

20. The method of claim 18, wherein the plurality of damping stages comprises a final damping stage, which comprises snubbing pads that limit an axial compression of the one or more first coil spring assemblies.

21. The method of claim 18, wherein:
the plurality of damping stages comprises a third damping stage, which comprises one or more second coil spring assemblies, each of which comprises one or more coil springs and is arranged within one of the plurality of pockets formed in and circumferentially about the sprocket plate;
each of the one or more second coil spring assemblies is arranged within a corresponding slot of the plurality of slots defined by alignment of the pockets of the one or more plates and the pockets of the sprocket plates; and
an angular displacement of the sprocket plate relative to the one or more plates causes each of the one or more second coil spring assemblies to move in the circumferential direction of the sprocket plate along a length of the slot in which each of the one or more second coil spring assemblies is positioned and/or, when the angular displacement of the sprocket plate relative to the one or more plates causes the slot to have a length that is shorter than an uncompressed length of the one or more second coil spring assemblies, to compress the one or more coil springs of the one or more second coil spring assemblies between opposing ends of the slot, as defined by contact of the one or more second coil spring assemblies with the sprocket plate and the one or more plates.

22. The method of claim 21, wherein each of the one or more second coil spring assemblies are positioned between coil spring holders that are slidably positioned within each slot in which one of the one or more second coil spring assemblies is arranged, wherein the coil spring holders compress the one or more coil springs positioned therebetween after one of the coil spring holders, in the direction of rotation of the sprocket plate, makes contact with an end of the slot in which such spring holder is positioned to engage the third damping stage.

23. The method of claim 21, wherein the one or more second coil spring assemblies of the third damping stage are shorter than the one or more first coil spring assemblies of the second damping stage, such that the one or more first coil spring assemblies of the second damping stage are compressed at a lower amplitude relative angular displacement between the one or more plates and the sprocket plate than the one or more second coil spring assemblies of the third damping stage, such that the second damping stage and the third damping stage are engaged sequentially as the sprocket plate is rotated relative to the one or more plates.

24. The method of claim 21, wherein the plurality of damping stages comprises a final damping stage, which comprises snubbing pads that limit an axial compression of the one or more first coil spring assemblies and/or the one or more second coil spring assemblies.

25. The method of claim 15, wherein the first torsional connection comprises an engine flywheel.

26. The method of claim 15, wherein the second torsional connection comprises a transmission driveshaft.

27. The method of claim 15, comprising reacting, using a centering bearing, axial thrust forces and radial forces and preventing cocking of the sprocket plate relative to the outer member.

28. The method of claim 27, wherein the centering bearing is a split bearing, having a first race in direct contact with a top plate of the one or more plates and a second race in direct contact with a bottom plate of the one or more plates, wherein the first race is on an opposite side of the sprocket plate from the second race.

* * * * *